United States Patent [19]

Hoffman et al.

[11] Patent Number: 4,890,241

[45] Date of Patent: Dec. 26, 1989

[54] ROBOTIC SYSTEM

[75] Inventors: Brian D. Hoffman, Somerville, N.J.; Steven H. Pollack, Washington Crossing, Pa.

[73] Assignee: Megamation Incorporated, Lawrenceville, N.J.

[21] Appl. No.: 112,534

[22] Filed: Oct. 26, 1987

[51] Int. Cl.$^4$ .............................................. G06F 9/00
[52] U.S. Cl. ...................................... 364/513; 901/8
[58] Field of Search ................. 364/513; 901/6, 8, 30, 901/49

[56] References Cited

U.S. PATENT DOCUMENTS

| | | | |
|---|---|---|---|
| 4,510,684 | 4/1985 | Hutchins et al. | 364/513 |
| 4,578,757 | 3/1986 | Stark | 364/513 |
| 4,586,151 | 3/1986 | Boute | 363/513 |
| 4,727,494 | 2/1988 | Boute | 364/513 |

Primary Examiner—Allen MacDonald
Attorney, Agent, or Firm—Louis Weinstein

[57] ABSTRACT

A robotic system in which robot devices are assembled from an inventory of elements responsive to a work request. The robotic devices include robots incorporating two-dimensional, linear motors movable along a stationary platen and coupled to various power sources through flexible, extendible, umbilical cords. The robot devices are selectively connectible with manipulators for holding parts to be assembled and/or for performing operations on such parts and/or members to which such parts are mounted. The devices are automatically assembled by selecting elements capable of performing the tasks necessary to complete the work request as well as selecting those elements which result in optimization of the assembly time and avoid collisions and cord tangling in moving along the paths traversed by the robot devices during their assembly. A multiplicity of assembled robotic devices may perform the tasks associated with the work request under control of an electronic system permitting simultaneous operations while preventing collisions and cord tangling. Robotic device assembly, disassembly and job tasks based on work requests can be performed simultaneously in any combination.

41 Claims, 16 Drawing Sheets

| LINE SEGMENT | LINE SEGMENT EQUATION | X–Y LINE LIMIT | | |
|---|---|---|---|---|
| A–B | Y=−4/3 X + 9 | 3 ≤ X ≤ 6 | | |
| A–M | X=6 | 1 ≤ Y ≤ 2 | | |
| B–C | Y=3 | 5 ≤ X ≤ 6 | | |
| C–M | X=2 | 6 ≤ Y ≤ 7 | 1 < Y < 5 | |
| C–D | Y=6 | 3 ≤ X ≤ 4 | | |
| D–M | X=4 | 5 ≤ Y ≤ 6 | | |
| D–E | Y=−4/3 X + 1.33 | 4 ≤ X ≤ 7 | | |
| B–N | Y=5 | 3 ≤ X ≤ 4 | 2 ≤ Y ≤ 6 | |
| E–F | X=7 | 1 ≤ Y ≤ 2 | | |
| A–F | Y=1 | 6 ≤ X ≤ 7 | | |
| L–K | Y=1 | 2 ≤ X ≤ 3 | | |
| K–O | X=3 | 1 ≤ Y ≤ 2 | | |
| K–J | Y=3/4 X −1.25 | 6 ≤ X ≤ 7 | 1 ≤ Y ≤ 4 | |
| C–O | Y=2 | 2 ≤ X ≤ 3 | | |
| J–I | X=7 | 4 ≤ Y ≤ 5 | | |
| H–P | X=6 | 4 ≤ Y ≤ 5 | | |
| H–T | Y=5 | 6 ≤ X ≤ 7 | | |
| J–P | Y=4 | 6 ≤ X ≤ 7 | 2 ≤ Y ≤ 5 | |
| H–G | Y=3/4 X +1/2 | 2 ≤ X ≤ 6 | | |
| G–L | X=2 | 1 ≤ Y ≤ 2 | | |

Fig. 14

ROBOTIC SYSTEM

FIELD OF THE INVENTION

The present invention is related to robotic devices and more particularly to a novel system for both assembling and controlling a plurality of robotic devices capable of simultaneous operation at the same work station.

BACKGROUND OF THE INVENTION

Robotic systems are presently in use in a wide variety of industries for a wide variety of applications typically in which there is a need to perform a large of number of repetitive operations. Given these requirements, robotic systems have been developed employing computers having programs which set forth every step necessary to perform an operation, as well as all of the data necessary to describe the physical "world" in which the robot operates.

Conventional robot languages have a model of the "world" that consists of the robot and "everything else", everything else being the physical or logical devices or points in space which the robot addresses. Languages of this type typically have procedural commands that move the robot and logic commands that activate the input output (I/O) devices which logically connect the robot to "everything else". Conventional robot languages force the user to describe every activity within the process, whether it be unique or repetitive. In addition, conventional robots are large machines which cannot work in close proximity to one another without colliding.

The present invention is characterized by providing a model of the assembly world which consist of resource "elements", such as robots, end effectors and feeders, which may be connected or otherwise associated with one another in a variety of different ways during execution of the assembly process. The present invention utilizes a system and operating software which creates an environment in which any "unique" operation is specified initially and only once by the user, whereas any replication (multiplicity of resources or work) is created by the internal system without the need for the user to provide any additional information beyond the user-supplied data base initially provided. The system of the present invention incorporates architected mechanics, electronics and software which are cooperatively capable of coordinating multiple resources for the purpose of automatically assembling the users' end products The "robots" of the present invention are "small footprint" robots with flexible "umbilical cords" and are capable of moving around one another more readily and more easily than prior art structures thus greatly enhancing the versatility and use of the system.

The present invention comprises a highly sophisticated computer system comprising a multiplicity of satellite CPU's linked to a main CPU through a high speed VME bus capable of performing numerous calculations and handling a multiplicity of data transfers between the various elements of the system on a real time basis. The satellite CPUs perform the calculations necessary for operating the robots in a high speed manner and in concurrent fashion.

In one preferred embodiment, the robotic devices are comprised of two dimensional linear motors movable along ferromagnetic platens. These members are powered through umbilical cords attached to a controller. The linear motors are capable of rapid acceleration, on the order of 1G, and linear speeds of the order of 40 to 100 inches per second. Stepping resolutions of the order of 0.0005 inch are obtainable.

The robotic devices are not dedicated fixed hardware structures, but to the contrary, are assembled from available cooperating elements including linear motors, connectors, grippers, end effectors and the like. The assembly is determined through the unique program which creates a robotic device, hereinafter referred to as a compound, in accordance with the requested task.

The robotic system, in one preferred embodiment, comprises an arrangement in which components may be mounted upon a panel advanced by a conveyor to the location of the robotic system. The system and supporting frame and cabinet stand above the conveyor to minimize the amount of valuable floor space used.

The unique system control, in addition to producing compounds based upon available components, also determines the capability of performing a particular function based on the availability of the components to be mounted, for example. In the event that an assembly at a particular station is not capable of being performed, for whatever reason, the robotic system at that location may notify the robotic system at the next downstream location having a similar capability of the need to perform the operation which has not been completed at the upstream location, causing the robotic system at the downstream location to give the yet to be completed operation priority over the operations allocated to the downstream location(s).

The unique operating system is further capable of accepting data from the user during a teaching phase, said data being comprised of a data base representing all of the physical and logical aspects of each element of the "world" comprising the robotic system and including, for example, the reference points of the system supporting frame supporting the robotic devices; the pertinent physical dimensions, functional capabilities and logical characteristics of each element capable of being utilized to assemble a compound; the work piece and all of the sites thereon adapted to receive components etc.

During said teaching phase, the user also provides data representing each different operation to be performed such as a "pick-up", "carry" and "place" for a component. Only those descriptions of unique operations need be provided, the capability of the operating system being such that the system will automatically create and assemble a compound and control that compound to perform an operation automatically when called upon to do so, in spite of the number of repetitions required to be performed.

Upon completion of the teaching cycle, the robotic system operates automatically until all required tasks have been performed.

Dependent upon the tasks to be performed the system determines the availability of elements and creates and assembles the compound upon establishing that all of the necessary elements of the compound are available. Upon completion of the compound, the tasks to be performed is initiated.

The system has the unique capability of enabling assembly of and operation by a plurality of robotic devices to be performed at the same work station substantially simultaneously. To assure that these operations are performed efficiently, the system has unique collision avoidance and umbilical cord detangling capabilities, as well as optimizing the time required to create "compounds" all of which contribute to efficient operation of the system.

OBJECTS OF THE INVENTION AND BRIEF AND DESCRIPTION OF THE FIGURES

It is therefore one object of the present invention to provide a novel robotic system which is capable of independently creating and assembling robotic devices and performing tasks therewith, based upon the availability of components for creating a robotic device and the availability of the component to be acted upon, as well as the availability of a path.

Another object of the present invention is to provide a novel robotic system which has the ability of "creating" and assembling the components necessary to perform a particular task, and assembling said components and performing said task automatically by deriving the description of the "world" from the data base description created by the user and the description of the work job level and procedures placed into the system during a "teaching" phase.

Still another object of the present invention is to provide a novel robotic system capable of controlling a plurality of robotic devices for performing operations on substantially the same work piece in a substantially simultaneously manner.

Still another object of the present invention is to perform all of the above-identified functions in an efficient and high speed manner through the use of a system employing a multiplicity of CPUs interlinked by a high speed bus.

Still another object of the present invention is to provide a robotic system in which a plurality of robotic devices are utilized to perform functions substantially simultaneously upon the same work piece through the use of novel collision avoidance and umbilical cord detangling techniques.

Still another object of the present invention is to provide a robotic system for simultaneously performing a plurality of operations in a common work space. The robotic devices being comprised of two dimensional linear motors movable upon a common stator and selectively connectable to a variety of end effectors.

The above as well as other objects of the present invention will become apparent when reading the accompanying description and drawing in which:

FIG. 1b is a top plan view of the work region of FIGS. 1 and 1a.

FIG. 14 is a table of the equations for mathematically describing the line segments of FIG. 13.

DETAILED DESCRIPTION OF THE INVENTION AND PREFERRED EMBODIMENTS THEREOF

Figure 1:
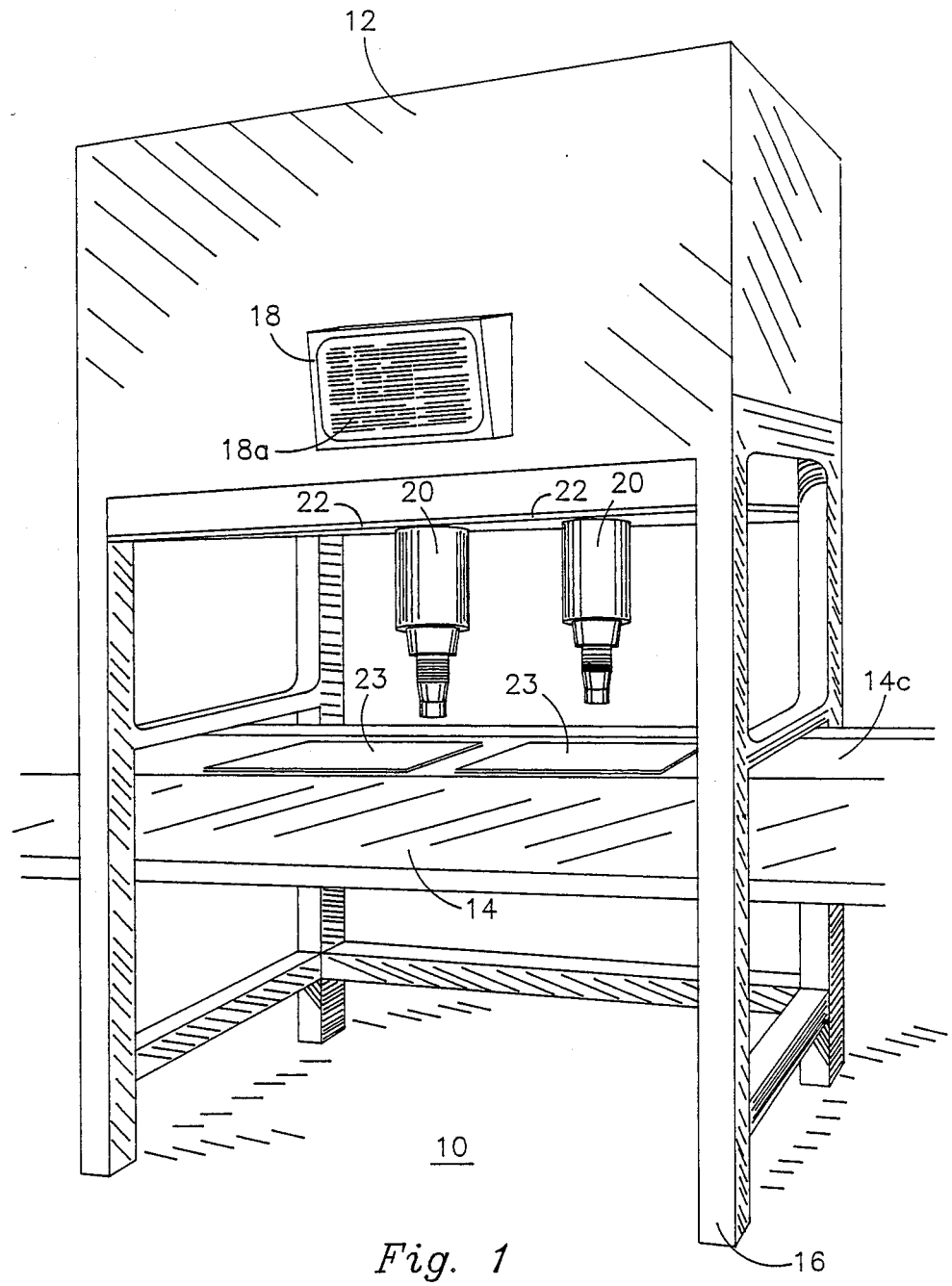
FIG. 1 is a perspective view showing a robotic system employing multiple robotic devices and embodying the principles of the present invention.

Conventional robot languages provide model of the "world" that consists of the robot and "everything else", everything else being physical and logical devices or points in space which the robot addresses. Such languages have procedural commands for moving the robot and commands for activating the input output logic (I/O) for connecting the robot to "everything else". Conventional robot languages force the user to describe every activity within the process, whether unique or repeated. In addition, conventional robots are large machines that are not capable of working in close proximity to one another without colliding.

The model of the assembly world in the present invention is comprised of resource "elements", such as robots, end effectors and feeders which connect and reconnect to one another in a variety of different combinations during execution of the assembly process. The present invention creates an environment in which "any unique" operation such as the procedure for acquiring a particular part, need be specified only once by the user while any REPLICATION (multiplicity of resources or work) is handled by the system of the present invention. For example, once any one arm knows how to build a product through detailed procedures, multiple arms use this information and are coordinated automatically to concurrently build the product without additional programming on the part of the user. To implement the system, mechanics, electronics and software have been architected to provide a capability of coordinating multiple resources in order to automatically assembly the users'end products. The implementation of the system includes robots having "small footprints" making the robots capable of moving around one another with relative ease.

STATEMENT OF THE PROBLEM

Modern assembly tasks frequently require combining multiple resources within a common work space. One example of combining resources is the provision of a pair of robots acquiring interchangeable end effectors in order to retrieve parts from several available feeders, prior to placing such parts in each and every one of the product insertion sites. The advantages of multiple resource sharing include:
1. Reduction in floor requirements;
2. Reduction in system by using manipulators which share expensive pheral resources and by controlling robots through a common control; and
3. Reduction in assembly cycle times through the employment of multiple manipulators performing assembly operations concurrently In the past, resource sharing has been difficult for a number of reasons which include:

1. Manipulator physical has classically been of the type em links and joints which structurally anchor t tool tip to the manipulator base. As the links often mechanically interfere with other, restricting the user's ability to the tool tips of plural manipulators close proximity to one another in order be able to share resources;
2. Typical manipulator languages are "procedural" (i.e. the manipulate system elements are sequentially ordered to perform operations). Such languages are typically geared toward systems having a single manipulator and only a few resouces. As the number of manipulators and system resources increase, programming complexity becomes extremely burdensome and even to impratical to obtain an operating system;
3. To obtain efficient operation in multiple manipulator/resource systems, it is necessary to combine and recombine system resources during the assembly process. Since the status of various system elements is only known as the assembly progresses, the allocations of resources must be performed during actual assembly. The present generation of manipulator operating systems do not provide this capability;
4. Current manipulator languages simply store spatial data, input/output data, and user defined variables for the manipulator(s) and resources in a single undifferentiated data base. As a result, useful information about the individual system "elements" is jumbled together as a sequential program which only links points in space and is lost; and
5. The present day manipulator packages do not offer software debugging packages which meaningfully aid the user in debugging a multiple resource system.

CONVENTIONAL ROBOT SYSTEMS

Assembly operations are conventionally performed by robotic devices comprised of link-type robots programmed with procedural languages. Such systems are typically based upon single arm operation and have few feeders and typically only one end effector. The implied "model" on which these systems are based comprises the robot(s) and "everything else".

The system controller directly moves the robot and interacts with "everything else" through input/output (I/O) lines. No software tools exist for organizing external devices in the world into "data bearing elements" such as part feeders, conveyors and end effectors. The job to be performed must be implemented by the user through the employment of commands which move the robot and communicate with I/O.

Present day robot systems typically employ link/joint mechanics. Such devices create severe interference problems when attempting to locate multiple arms in close proximity at the same work station.

The system language (VAL II) employed by the ADEPT ONE robot produced by ADEPT TECHNOLOGY, INC. is a procedural BASIC-LIKE language controlling the robot through command that specify the end point of the move and can control motion characteristics such as maximum velocity. In addition, commands are provided to control input/output lines, make logical decisions based upon the I/O, receive data from a machine vision system and track parts along a moving conveyor. While the robot assembly program is running, three additional programs can be executing (in the background to control I/O). No motion commands are allowed in the background program. The program further allows the user to continuously monitor external signals at regular intervals of the order of 16 milliseconds and execute an alternative control program when such an external signal (or signals) occur.

Although a technique is provided to assist the user in the set up of required information for the assembly operation, the program simply saves the user from writing a complex and total assembly program.

The KAREL control language employed by General Motors/Fanuc is similar to the VAL II control program described hereinabove and has the additional capability of allowing more control over the robot and I/O during robot motions. Although multiple background programs may be run simultaneously with the robot program, such programs are limited to checking system conditions with respect to signals, time and distance and it is not possible to operate a background program to perform calculations as is possible with the VAL II program.

ROBOT ASSEMBLIES

The robot assembly ADEPT ONE produced by ADEPT Technology, Inc. comprises a link arrangement with "shoulder" and "elbow" axes which rotate in the horizontal plane to provide X-Y positioning. Vertical motion is obtained through a lifting stage provided at the end of the "elbow" link. The lifting stage is also capable of rotation for forming applications such as driving screws or the like. The system employs high power direct motors (eliminating gearing) for high speed operation. A typical robot structure has a 30 inch height and can carry a 15 pound load. The arm assembly typically weighs 600 pounds. The system is capable of operating two arms in close proximity to one another but requires that each arm receives "a motion clear" signal from the other before attempting to move into a common work area. In addition, the nature of the link geometry and robot size permits only a very small possible overlap area. Also each robot is fixedly positioned to the "world" support frame.

The IBM 7565 robot is a cartesian gantry design employing linear actuators to provide X, Y and Z movement. A three axis "wrist" is secured to the bottom of the Z or vertical stage to provide pitch, yaw and roll movement. A gripper is mounted to the "wrist" assembly. An alternative version employs two arms arranged on the same X traverse of the frame. Since the two arms exist on a common linear stage they cannot travel around one another, the X motion of the left arm being limited to the space between the left edge of the frame and the left edge of the second robot. The right arm travel is similarly limited.

The Automatix multiple robot system employs two dimensional linear motor technology and in one design includes three manipulators each carrying a tool and a camera. It is the responsibility of the programmer (i.e., user) to provide routines to control each of the three robots in order to run the routine simultaneously so as to avoid collisions in which collision avoidance is accomplished by setting and resetting user define variables (flags) as each robot enters and leaves a potential collision zone.

Applicants' robotic system may be summarized as follows:

Any "unique" operation must be defined by the user. However, any REPLICATION (i.e. multiplicity of resources or work) is provided within the robotic system having electronics, mechanics and software designed to implement the aforesaid objectives.

The robotic system of the present invention is capable of automatically combining common resources provided at an assembly station for the purpose of engaging in the assembly of products and/or the performance of tasks, which assembly processes include, but are not limited to:

1. Mating a plurality of components or subassemblies at sites on a product or other product subassemblies;
2. Tasks such as gluing, heating, inspection, etc.

The system for implementing the process comprises:
1. Manipulators and/or robots capable of sharing common work space as well as common system resources;
2. End effectors;
3. Parts feeders and/or subassemblies feeders;
4. Conveyors for transporting products;
5. An operating system capable of:
   A. Automatically allocating system resources to optimize the manufacturing and/or assembly process;
   B. Controlling the motion of robot resources for work performance as well as collision avoidance;
   C. automatically linking the system I/O with resources for controlling those resources in combination with one another.
6. A system language capable of permitting the user to create the programs which describe the assembly job in terms of assembly actions (such as "get part M", "transport part M") while leaving specific resource allocations to the operating system;
7. A teaching technique which creates sufficient data bases to enable the operating system and user program to dynamically allocate resources at run time;
8 A debugging method for facilitating the debugging of a multiple resource system in which the resources are automatically selected by the operating system.

FIG. 1 shows a perspective view of a robotics system 10 embodying the principles of the present invention and being comprised of a housing 12 supported above conveyor 14 by support frame 16. Housing 12 contains all of the system electronics and, being positioned above the work area, saves valuable floor space. Housing 12 is provided with a control panel 18 which includes a color touch screen 18a to facilitate operator interaction.

In the arrangement shown in FIG. 1, the system employs a plurality of manipulator arms 20,20 to maximize throughput and process flexibility. Each manipulator is provided with a direct drive two dimensional linear motor utilizing air bearings for high speed accuracy and reliability and for moving the manipulators in the X-Y direction. Each manipulator is provided with drive means for moving the end effector in the Z direction as well as providing a pick and release operation. The system 10 and its supporting frame 16 are designed to fit over existing conveyors, thus reducing floor space requirements while providing easy access to the products being worked on.

Figure 1A:
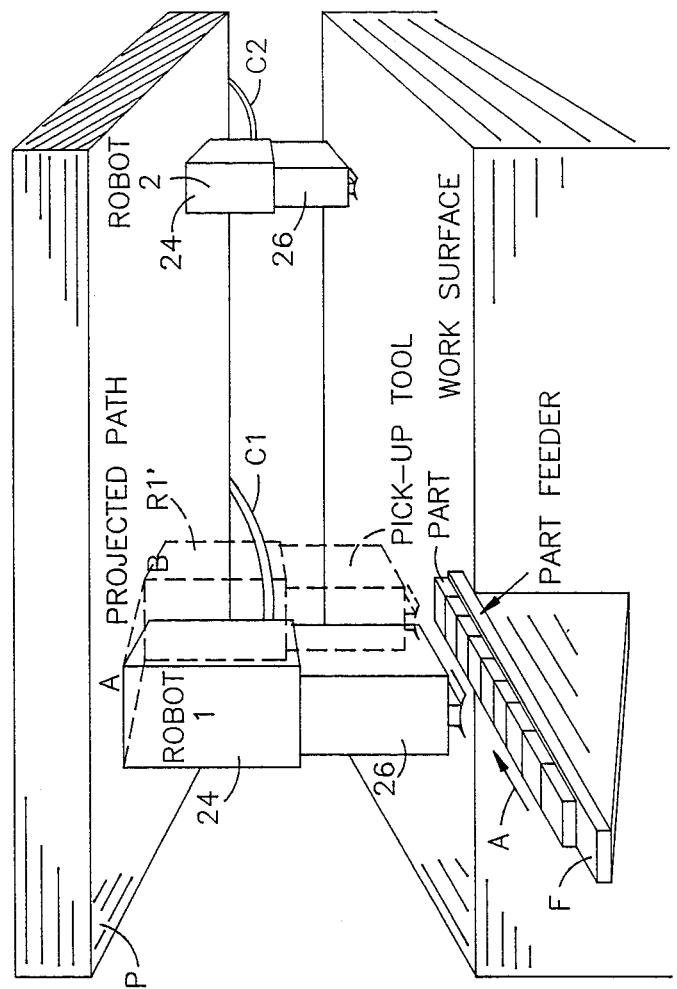
FIG. 1a is a perspective view showing the robotic devices of FIG. 1a in greater detail.
Figure 1B:
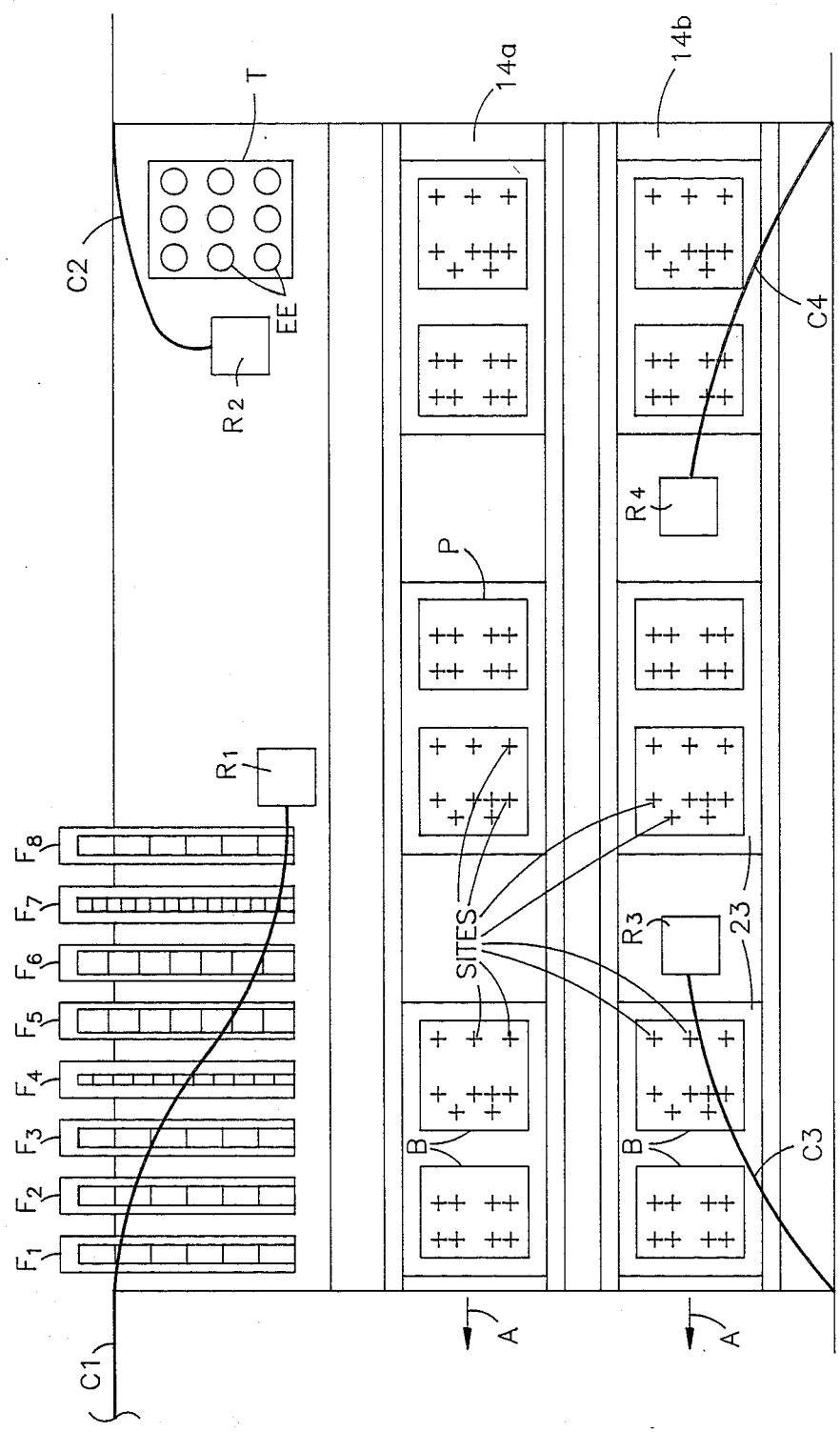

FIGS. 1a through 1b show details of the work station and robotic devices. FIG. 1a shows robots R1 and R2 of the two dimensional linear motor type and which are movable along the platen P which enables the robots to engage in substantially totally free movement in the X and Y directions limited only by the surface extent of platen P and the portion of that area occupied by the other robot(s). The work surface comprises a conveyor 14 having a moving conveyor belt 14a (see FIG. 1) conveying each of the products, such as, for example, panels 23, 23 successively moved to the assembly position beneath the platen P. Depending upon the nature of the product, such as for example, panels, printed wiring boards or the like, more than one of such panels may be positioned beneath the platen P to enable assembly or mounting of components thereon.

A parts feeder F conveys the parts positioned thereon to a take off location, said parts being moved in the direction shown by arrow A to place each part in the take off position.

Considering, FIGS. 1a and 2, a "compound" (i.e., robot device) is comprised of a robot 24 and end effector 26 and male/female connectors, which will be described hereinbelow as being "A" type connectors, said end effector being appropriate for gripping the part to be placed on the assembly site and/or further being appropriate for performing an operation on that part, such as for example, heating, providing air pressure for a particular function such as air cleaning, or the like.

FIG. 1a shows the manner in which robot R1 moves from a quiescent position R1 to the pick up position R1' in order that the end effector 26 be positioned to pick up a part from a part feeder F. Such motion initially comprises: movement in the X-Y plane to the pick up location; followed by movement in the downward vertical ($-z$) direction; gripping of the part by manipulators (not shown) which may either be a pair of holders squeezed together or a vacuum operated holding implement; followed by a lifting operation, i.e. movement in the upward vertical ($+z$); thereafter followed by movement in the X-Y direction to the assembly site; lowering to the assembly site; and placement of the part thereon.

FIG. 1b shows a plan view of a work station comprised of a pair of conveyors 14a, 14b for conveying a plurality of panels in a direction shown by arrow A, the panels 23 each having a plurality of boards, such as, for example, printed wiring boards each having a plurality of sites, each site receiving a particular part. The types of parts that are to be assembled upon the printed wiring boards can vary and the work station shown in FIG. 1b is thus provided with a plurality of part feeders F1 through F8. Feeders F1 through F3 may, for example, dispense one type of part; feeder F4, a second type of part; feeders F5 and F6, a third type of part; feeder F7, a fourth type of part and feeder F8, a fifth type of part. Said parts may, for example, be passive components such as discrete resistors, capacitors and inductors or active components such as discrete transistors, diodes, integrated circuits and the like.

Robots R1 through R4 move above the conveyors and are suspended from the cooperating platen (not shown in FIG. 1b) and are capable of moving over substantially the entire surface area of the platen P, said movement being facilitated by use of umbilical cords C1 through C4 of sufficient length and flexibility to facilitate the aforesaid movement.

A tool changer T is provided for storing end effectors EE preparatory to use. Although only one such tool changer is shown in FIG. 1b, it should be understood that additional tool changers may be provided. The tool changer T may include adequate means for storing a plurality of different types of end effectors or alternatively, each different type of end effector may be stored at a different tool changer. The part feeders and tool changers may be arranged side by side or may be at other locations along the work station, such positions being chosen to optimize operating efficiency and to minimize actual work time.

The language employed in the system contains the usual types of data such as integers, reals, strings, etc. The system further employs data types which:
1. Allow each resource in the system to be described separately;
2. Describe how individual resources may be connected to each other;
3. Enable data communication from one work station to another.

The system is described in terms of separately defined resources enabling the resources to be shared and recombined in a variety of different combinations. Information about each resource is considered to be in "relative frames". This relative information, whether spatial, mechanical, electrical or "logical", is linked through adjoining resources, terminating at the system's "absolute frames" which constitute the physical frame for spatial data and an I/O control cabinet for I/O lines. During assembly the system then knows where the resources are with respect to the physical frame, how to acquire them and how to "activate" the resources with respect to the I/O control cabinet, after being acquired.

Each of the data types will now be described.

ELEMENTS

An element is defined as the information about a system resource which is sufficient for defining its:
a Physical properties;
b. The manner in which it links to other elements mechanically and electrically and logically;
c. Any additional characteristics the user may wish associate with the element and which may go beyond those anticipated by the system.

Since the operating system specifies actions which imply the allocations of resources, a data-type which fully describes each resource to the operating system is provided to enable automatic resource allocation by the operating system.

The physical parameters of an element comprise the activities an element can perform as well as the attributes or characteristics of the elements (such as weight and size).

In order to automatically allocate resources (i.e. elements) the knowledge of the ways in which elements connect mechanically, electrically and "logically" (i.e. linking of symbolic names with physical connections) must be provided. Thus the notion of an element connector is incorporated within the definition of an element. Such connectors are identified by their specific mating characteristics both mechanically and electrically.

Figure 2:
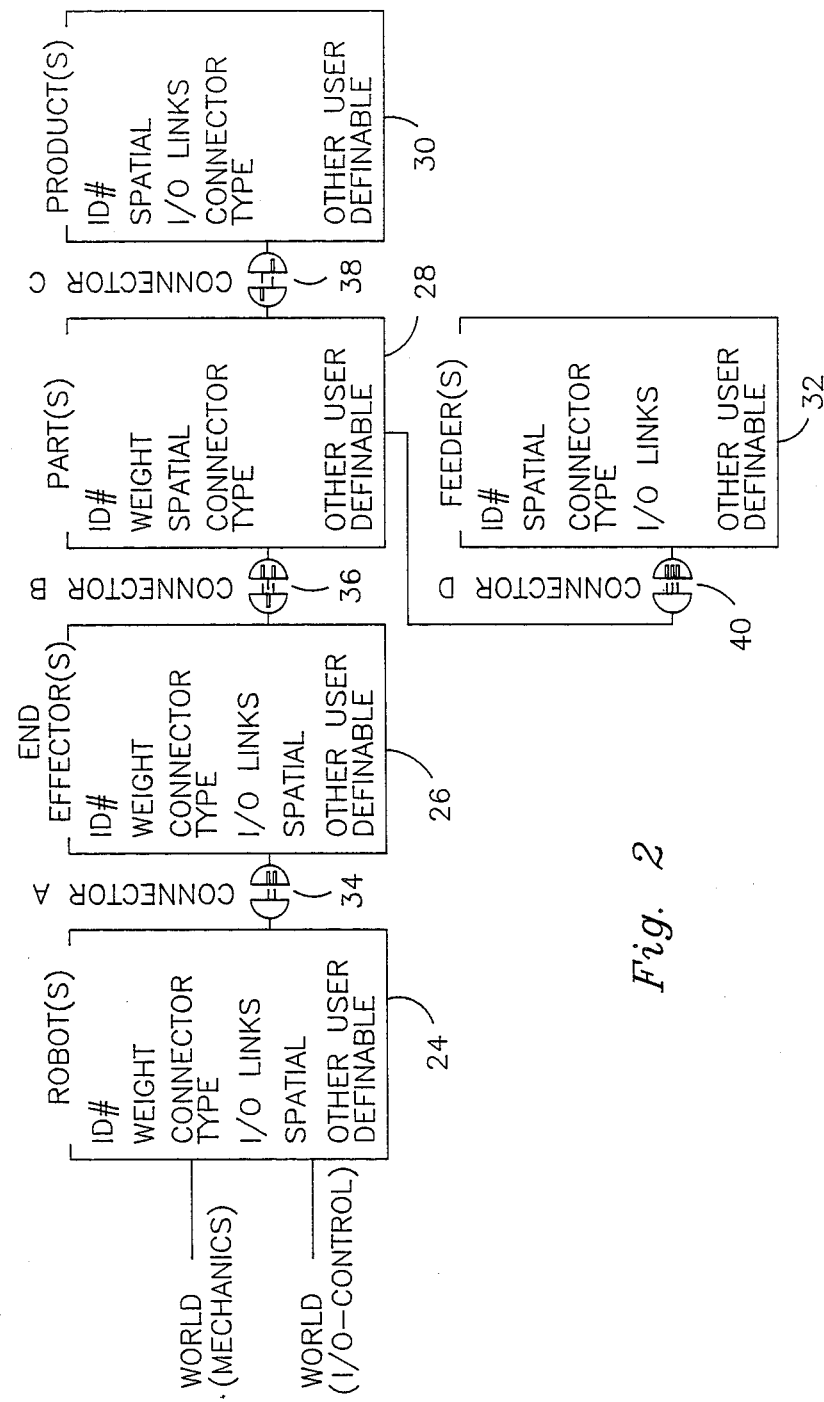
FIG. 2, is a block diagram useful for explaining the interconnection between elements of a "compound".

FIG. 2 shows an arrangement in which selected resources are mated by connectors selected in accordance with the resources to be combined. For example, the combined resources include robot 24, end effector 26, part 28 products 30 and feeders 32 which are interconnected by different types of connectors which are identified as connectors 34, 36, 38 and 40. Each resource is defined in the manner shown in each of the black boxes of FIG. 2. Robot 24 is mechanically coupled to the "world", for example, by means of its two dimensional linear motor which cooperates with an associated platen P. The robot is coupled to the I/O and control portions of the "world" which respectively include electrical, mechanical, pneumatic and other like connectors as well as controls for starting, stopping and accelerating movement of the robot, and so forth.

The mechanical features of the connectors include spatial data identifying the location of the connector on each element; The type of mechanical coupling (such as bayonet, pneumatic, clamp, etc.); another connector is of the "source" (male) or "sink" (female) type; as well as any other user defined properties of the connector. As an example, note FIG. 3 which shows the spatial relationship of two robots, a feeder, a tool changer and a product (panel) sink relative to a home monument location. Note, that each element has its own "x-y" reference.

Figure 3:
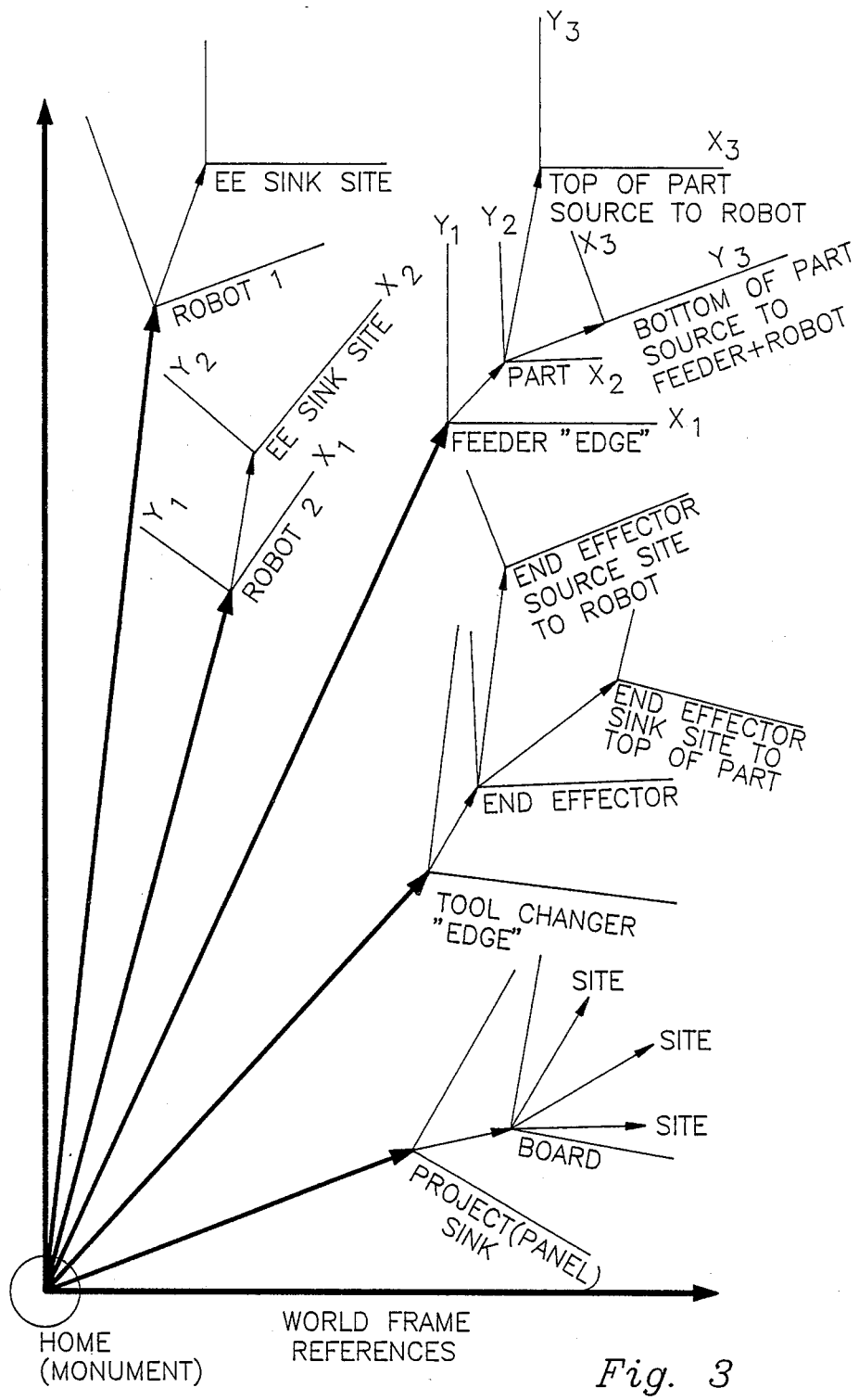
FIG. 3 shows the locations of the connecting points of elements in the "world"

Considering FIGS. 2 and 3, as one example of a mechanical connector, the robot 24 may have a "sink" (female) type connector 34 which is physically located at the position x, y, z, $\theta$ with respect to the robot's datum and which is attached to a specific pneumatic clamp or end effector 26. This connector may, for example, be identified by the name "C-SINK". Thus any "C-SOURCE" (male) connectors are proper mates.

Considering a robot which is attached through a mass connector, for example, identified as being a "D" type connector to the control cabinet, selected ones of the large number of wires and pneumatic lines coupled thereto fan out to devices in the robot, some fanning out to an external connector, for example, of the "C" type and go from there to the end effector. In such an arrangement, those "D" type pins (or tubes) which mate with the "C" type (pins or tubes) must be defined. The logical connections for wires (or tubes) from the "D" connector to terminate inside the robot must be defined.

Figure 5:
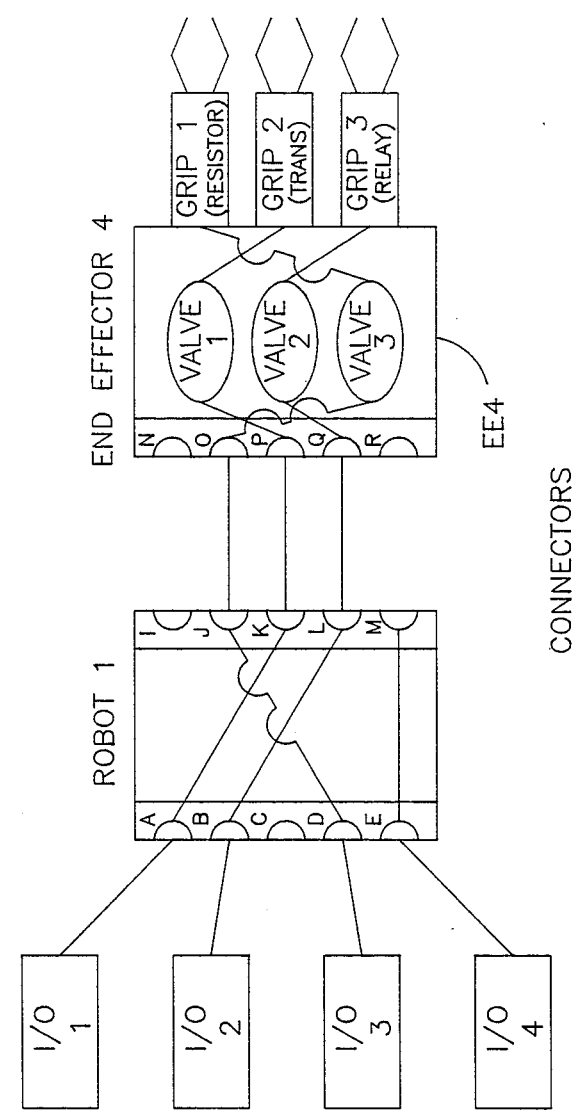
FIG. 5 is a block diagram which shows the manner in which the I/O devices are coupled logically to the robotic devices.

Logical connectors are mappings between symbolic names and physical pin outs (both electrical and pneumatic). For example, a "HAND" may be defined as connected to PNEUMATIC TUBE 1. When a command to close the "HAND" is issued, the system links the word "HAND" to "PNEUMATIC TUBE 1", which is service-linked to the control cabinet. Electrical functions can be effected in a similar manner. FIG. 5 shows a simplified block diagram of a robot R1 connected to I/O devices through connectors A through E and connected to end effector type EE4 through connectors J through L. Grippers G1 through G3 on EE4 are respectively connected to connectors O, P and Q through valves V3, V1 and V2.

The system allows connectors to be individually disabled or "covered". When a connector is "covered" by insertion of the proper data, the operating system will not choose those elements that would have been chosen (connected) during automatic resource allocations. The usefulness of this technique can be understood by considering a board assembly operation, for example. The board which may be a printed wiring board, can be modeled as having sites which "connect" with the components to the board. By selectively "covering" the connectors to certain sites, the user specifies to the operating system that the covered sites are not to be inserted by that particular work station. This technique is a convenient way of specifying what work is to be done (namely, inserting the non-covered components) without introducing extraneous variables.

The system further allows variables to be created that are defined locally, for each occurrence of each element. As an example, assuming that it is desired to know the amount of time each robot and end effector has been used (for maintenance purposes) the user may define a variable called "use" which is local to the robot element and the end effector, thereby making it possible to store the "use time" by referring to the variable and the specific element [e.g. "ROBOT USE(3)" contains the USE data for the third robot].

Another type of data provided in the system is the "compound" which comprises the collection of elements grouped in a specific sequence to perform certain action. By describing compounds, the user tells the operating system the rules by which the elements are linked. As an example, a compound may comprise an "arm" capable of grasping relays which compound is formed of an end effector (capable of grasping relays) connected to a robot capable of carrying the aforesaid end effector.

The spatial information defining connection points and the like is graphically shown in FIG. 3. For example, the portion of robot 2 which connects to an end effector is precisely defined relative to the home location x-y. The end points along the effector which respectively connect to the robot and for coupling to a part are likewise precisely defined relative to reference frame $X_1$-$Y_1$. Similarly, the point along a feeder at which the part is mounted is defined relative to the home location and the top of the part and bottom of the part are defined relative to the feeder and hence relative to the home location. This spatial information is provided for each of the resources as shown, for example, in FIG. 2 including robots R1, R2, a tool changer, a product sink and a feeder.

To facilitate data communication between work stations of the type shown, for example, in FIG. 1, the system provides for the creation of "electronic paperwork", each "piece of paperwork" being a collection of the names of previously defined global and local variables. When a command is given to "mail" (i.e. transmit the paperwork), the operating system retrieves the latest values for all of the named variables. "Pieces" of the paperwork are individually named so that they can be referred to by the operating system and the "paperwork can be mailed to a specific destination through the controller's I/O devices.

As an example, paperwork may be created to transmit from work station 1 to work station 2. Assuming both stations have a responsibility for inserting relays and transformers into a circuit board along a progressive assembly line and further assuming work station 2 is required to insert during a predefined "build_time" based upon the conveyor cycle, those parts not inserted by station 1. After "build_time" of a predetermined time interval has expired, paperwork identified as "build_status" is created. The contents of the data base includes:

circuit_board.relay.site_insertion_data ()
circuit_board.transformer.site_insertion_status ()build_time Each time a command is given to mail the paperwork named "build_status" this constitutes a request for the transmission of two arrays, namely the insertion status of the relays and transformers and the transmission of the build time. The operating system obtains the latest values of the data bases before the transmission takes place thereby enabling work station 2 to insert only those relays and transformers whose "status" indicated "non-insertion" in the mail received from work station 1. These tasks can be given priority and are performed prior to other tasks to be performed by work station 2 such as apply heat to sites on transformer (for soldering), for example.

The system provides for the teaching of two different types of data, namely:
1. Data that is "global" to the system;
2. Data that is local to an element.

Global data encompasses the type of spatial and non-spatial data found in other languages and includes the teaching of points, offsets and coordinate systems (spatial data) as well as global I/O signal names, work station serial numbers, time of day, etc. (non-spatial data) which will be omitted from the ensuing discussion for purposes of simplicity and further due to its self evident nature.

The main teaching job is that of setting up data bases that are local to the elements i.e. to fully describe the elements. The pieces that make up an element (i.e. physical parameters, connectors and local variables) have been described hereinabove. However, it is important to understand that all required element data must be provided by the user. An important element data base is the "activity's list" associated with each element which constitutes the activities each element is capable of performing. The possible activities will hereinafter be referred to as the "verbs". For example, end effector EE3 may be capable of grasping a relay, heating a spot on a circuit board and ultrasonically cleaning a component. Given such a structure, EE3 would thus have three verbs associated therewith (grasping, heating and cleaning) In addition, each such activity may have a list of objects associated with that activity. Citing another example, EE3 may be capable of grasping relays, but not transformers. Such an object list is hereinafter as identified as a "nouns". Thus, one of the element data bases that must be taught is a list of verbs together with their associated nouns.

The operating system is designed to provide the following functions:
1. Allocating resources;
2. Performing motion control;
3. Selecting non-colliding paths for the robots;
4. Activating specific I/O modules for implementation of the I/O request;
5. Communication with devices external to the work station; and
6. Monitoring asynchronous "background" events which may be both system-defined and user defined.

The system has the responsibility of allocating the resources necessary to carry out an activity, it being the responsibility of the user to specify the assembly activities capable of being performed by the elements.

A request for resources is initiated by a command. For example, assuming it is desired to execute the command "GET relay WITH arm". This command causes the operating system to allocate an arm capable of getting (i.e. grasping) relays. The following is a list of the possible responses to such command:
1. If at least one arm capable of handling relays is available (i.e. not assigned to any other task, that arm will be assigned to the command and the assigned resource is "locked-up" until a defined task is complete.

2. If no arm is presently available for grasping relays but some combination of unassigned elements are available to create such an arm, the operating system will be executing "hidden" system routines to create a "relay arm".
3. If there are no arms presently available for grasping relays but some combination of unassigned compounds and elements exist which can combine to provide such an arm, the operating system will begin executing "hidden" system routines to:
   (a) disassemble the unassigned compound(s) and thereafter;
   (b) create a "relay arm" suitable for performing the requested task.
4. As an example, a "transformer arm" comprising robot R3 and end effetor EE5 (a transformer EE) could be disassembled by returning EE5 to the tool changer, enabling robot R3 to be combined with EE2 ( a relay EE) to provide a "relay arm".
5. If the resources required to satisfy the request have previously been committed, the operating system sets flags indicating the request temporarily can not be granted thereby blocking the command from further execution until the necessary resource or resources are freed.

The operating system employs the data bases (e.g. elements, connectors, etc.) created during the teaching phase to allocate resources in order to satisfy such commands.

Figure 4:
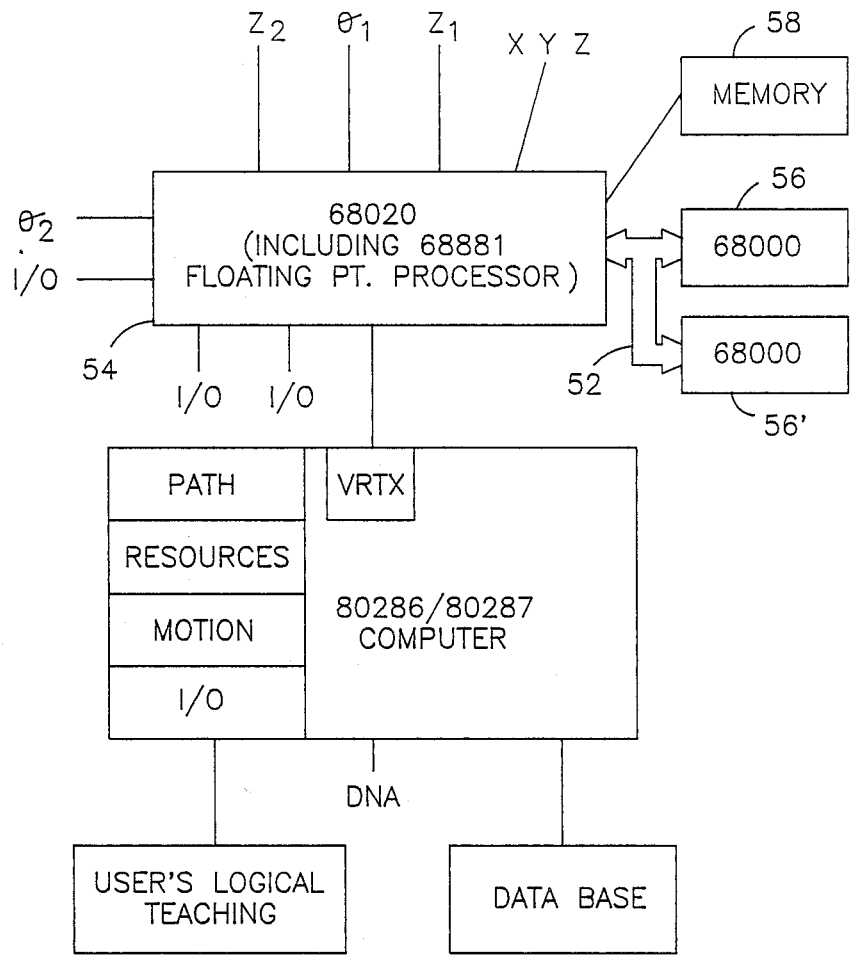
FIG. 4 is a block diagram of the system electronics.

FIG. 4 is a block diagram showing the control system for operating the robotic devices and providing, among other functions, controlling motions, calculating non-colliding paths, allocating resources, communicating with external devices and the like. The system 50 utilizes a multiple computer bus 52 employing a signal protocol allowing multiple computers to share peripherals and communicate with each other on the bus. Bus 52 is preferably a VME bus which is an international standard computer bus architecture for use with multiple computers. The architecture of the VME bus provides a "system controller" which arbitrates contentions for the bus when multiple computers share bus resources. Computer 54, which preferably includes support chips such as floating point processors, performs computations in real time and is preferably a 32 bit device capable of running at clock rates in the range from 10 to 25 megahertz. The computer 54 may, for example, be a Motorola type 68020 cooperating with a Motorola 68881 floating point processor. The VME bus 52 links computer 54 to the plurality of CPUs 56, 56', etc. (only two such CPUs being shown for simplicity).

The hardware for implementing a multiple computer environment may be comprised of Heurikon type HK68-V2F or HK68-V20 each of which incorporates a 68020 MPU, a 68881 floating point processor and the VME bus.

The memory 58 is coupled to the 68020 MPU and preferably utilizes a real time multitasking operating system kernel such as VRTX (from Hunter & Ready Inc.) for servicing MPU 54 with data stored in the memory which includes: the data base of the system, the operating system (DNA-05); a user program (written in the DNA language); and the user's logical teaching which incorporates all of the data necessary to describe resources, compounds and jobs, for example. The MPU 54 is further coupled to sensors providing data identifying the instantaneous positions of the robot devices as well as the states of the I/O devices which may be associated with each robot, which data is also necessary in the performance of the monitoring and control functions The MPU 54 is also coupled to the I/O devices to select the proper I/O and control their operation (i.e. on/off).

The software support for the real-time operating system 59 is capable of responding to asynchronous events such as an "emergency stop" signal, for example, and coordinates the information flow among tasks running "concurrently". "Concurrently" can mean either:
   a. tasks running on different computers at exactly the same time, or
   b. different tasks that are running sequentially on one board but are running so often and so quickly that they appear to run at the exact same time relative to the speeds of the mechanical system.

The VRTX system utilized in the present invention is a real-time operating system kernel available from the Hunter and Ready Corporation. The VRTX software is incorporated, for example, in the Heurikon HK68-V2F and HK68-V20 devices to provide a real-time hardware/software environment enabling the 68020 computer to be configured on the VME bus to obtain high performance, real-time computing.

The data inputted to the computer 54 is preferably coupled thereto through "intelligent I/O cards" which contain an on-board computer to relieve the main system computer of routine I/O tasks, for example, external serial devices such as an external work station may be coupled to the main computer through the IV-1624 intelligent serial I/O card available from Ironics Incorporated. Such a device contains eight (8) serial ports capable of communicating with the external serial device and having an on-board computer such as a type 68010 for handling the communication details such as retransmission in the event of a communications' error. Other intelligent cards are utilized to handle digital bit I/O, analog I/O and servo control, which signals are provided to the robotic devices. For example, a digital control signal is converted into analogue form preparatory to application to a robotic device, for controlling velocity, for example.

The system language (DNA) is designed to allow the built-in system software to handle all "replications" of work (for example, building copies of the same assembly by using multiple robots to increase throughput). The user programs all "unique" aspects of the work with DNA and sets up the data bases by employing a "teach" package, allowing the operating system to attend to replication.

Figure 6:
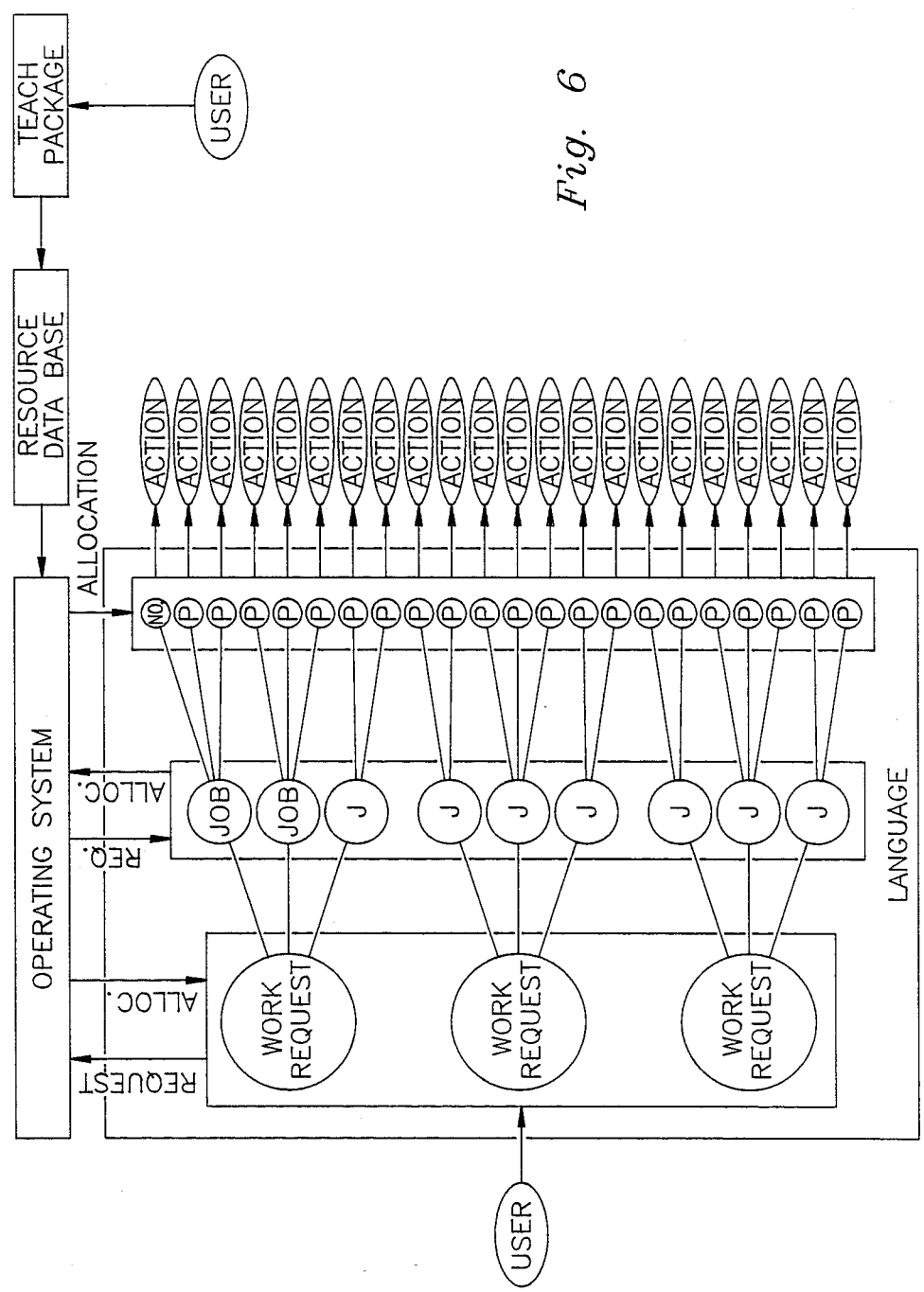
FIG. 6 is a simplified diagram useful for explaining the operating levels of the robotics system of FIG. 1.

The system language is divided into three levels (making reference to FIG. 6);
1. "work request"— highest level
2. "jobs"— middle level
3. "procedures"— lowest level.

The procedure level is the lowest level in the system language and is similar to conventional robot languages. In order to perform simple operations, a user performs all of the required programming exclusively at this level. Programming without the other levels implies that the user must detail all of the resources that each action requires which effort is substantially the same as that required from the user when programming conventional systems in conventional languages. The program generalizes into a multiple-resource handling software system once the user completes the programming of the remaining two levels set forth hereinabove.

The procedures level encompasses the picking up and placement of parts and includes the basic elements of moving to feeder from last position; lowering; grasping; raising; moving to site; lowering upon site; releasing part; checking for insertion and departure. Obviously, other basic elements include tightening (i.e. in the case of a screw or nut) heating (such as soldering), etc. depending upon the particular operation being performed.

In order to perform automatic resource allocation, the operating system answers the following inquiries implied by a language command:
1. WHICH resource is being addressed?
2. WHERE is the resource "spatially"? (and electrically, when an I/O is involved).
3. HOW MANY times is the work to be performed? (i.e. what is the "termination" criterion).

It can be seen that the description of the elements, compounds and connectors in conjunction with the system language command, are sufficient to enable the operating system to answer all of the above questions.

In the example of the three levels of the system language, to be set hereinbelow, the elements referred thereto include:
1. boards (B - FIG. 1b)
2. panels (P - FIG. 1b)
3. end effectors (EE - FIG. 5)
4. robots (20 - FIG. 1)
5. feeders (F1 through F8 - FIG. 1b)
6. towers
7. components
8. blocks The only compound in the examples set forth hereinbelow is the "arm" which is made up of an end effector attached to a robot.

It should further be understood that the examples to be given are simplified and that further additional statements would normally be provided in an actual assembly program.

The highest level of the language comprises work requests. The operating system looks for each independent request (designated by a "DO-END DO" statement) and submits tasks to the multiple-task operating system to initiate simultaneous processing of the requests. In the example, the requests are to build ten (10) "towers" and to assemble "all" boards in a panel.

Work can be requested to occur sequentially or concurrently. In the example to be given, towers are built one after another (as indicated by the FOR-NEXT loop), whereas the operating system begins to build all the boards in the panel at the same time (as indicated by the ASSEMBLE ALL clause).

The answers to the resource allocations questions (WHICH, WHERE and HOW MANY) are handled differently for the two above mentioned work requests. In the build tower work order, the answers are as follows:
1. WHICH: The towers are built in order from one (1) to ten (10), the numbers being derived from the array numbering recorded during the teaching phase.
2. WHERE: Each tower is to be provided at a location called "tower-site", specified as array of locations in absolute world coordinates, the sites being numbered from one (1) to ten (10), during the teaching phase.
3. HOW MANY: The number of towers specified exactly in command: 10 towers are to be built.

For the board assembly, the answers are the following:
1. WHICH: The operating system assumes the task of allocating the board to be worked upon, as indicated by the open bracket next to "board" (i.e., "board[]"). By specifying the ALL clause, all boards in the panel are worked on concurrently (as well as concurrently with the construction of a single tower). As the operating system allocates boards, it keeps track of specifically which board is being worked upon.
2 WHERE: The command indicates that each board is in a panel and that the panel is in the world. By using the "connectors" the operating system can determine the exact world coordinates of each board.
3. HOW MANY: Since the operating system must build all of the boards, it determines this number by determining the number of enabled connectors that link the board element with the panel element Any "covered" connectors will not generate work, as was described hereinabove.

At the second level, the jobs that comprise a work request are detailed in terms of "procedures" to be performed. The operating system chooses specifically resources including allocating "arms" to perform the required motions. A job is initiated when called by a work request from level one (1) (see FIG. 6). An executing job can also generate additional tasks for the multitasking operating system, each concurrent task being specified by a "DO-END DO" construction.

In the example set forth hereinbelow, the tower is comprised of blue, white and red blocks. Assuming the structure is such that the block "sink sites" are set up so that a blue block sink site is located at the tower site (which is located somewhere in the world), a red block sink site is located on the top of the blue block and the white block sink site is located on top of the red block. Given the aforesaid designation, a tower thus comprises a white block on top of a red block which is on top of a blue block. When the system language begins execution, three arms would simultaneously try to get a blue, white and red blocks (from the GETBLOCK procedures). However, due to connector restrictions, the arms are forced to put down the blocks in the order of blue, then red, then white. As each tower is completely finished, the next one of the remaining towers is assembled.

In the board assembly example, since ALL components on the board are to be placed simultaneously, this means that the operating system sends off as many arms are available to obtain components. All boards on the panel are to be worked on simultaneously as well (from the Level 1 request), enabling the operating system to select any component for insertion on any board, without restriction. Once SPECIFIC choices have been made, the procedures to make up the jobs are then called At level three (3) the specific order of action is called for in terms of procedures, all resources having been allocated from the previous level (2). If any compounds like "arm" are specified that required disassembly, such as a robot attached to the wrong end effector, the operating system will execute a "hidden" routine.

Hidden routine comprises a series of moves and I/O executions that result in a compound (or assembled robot) returning its tool back to the tool crib, making the arm available for another type of task. A hidden routine sequence is not user written. Rather, the operating system, having generated a request for a new compound, utilizes the records (data bases) developed during the teach phase to merge with a preprogrammed routine. The routine identifies an empty tool slot, followed by a path request to that crib. The routine then executes move commands to place and release the tool within the tool crib. The availability of the robot for a new task is than achieved. The system program automatically calls upon this subroutine which merges logical, physical and spatial data from the teach records to accurately direct the arm and system I/O. The flow diagram shown in FIG. 11 graphically depicts such an event. More particularly, when an arm request is generated a test is made to determine if an arm is available. A hidden routine is initiated when no arm is available whereupon a compound is moved to a tool crib for returning the tool, based upon the coordinates necessary to identify the crib and an available slot therein as well as a path request to limit movement of the robot arm to the tool crib location only upon assurance that the requested path will not create a collision condition. Once the tool is returned, an arm available signal is provided and the routine branches to the arm available test step.

MOVE commands at the procedure level generate requests for non-colliding paths. Once a path has been allocated to a resource, no other resource may intrude on the space until it is deallocated.

I/O commands at the procedure level require that the operating system determine a specific signal path from the control cabinet I/O module through to the target element I/O line. In the example given, various insertion sensors are read, the exact ones being determined by the operating system at run time after the robot and end effector selection has been made.

The automatic resource allocation capability of the present system reduces the programming obligations of the user to the extent that the user need only specify what needs to be done while the operating system chooses the specific available resources, such as part feeders and end effectors, from among all of the available resources.

In order to accomplish this result, sufficient information is provided to the operating system by the user during the TEACH process. A teach phase is completed once the operating system has been informed about the spatial location of all elements. In addition, all relevant properties of the elements are taught to the operating system such as the "activities" performed by an end effector (for example, "grasping", "heating" or "turning").

During operating of the system, the actual resource allocation takes place utilizing a variety of algorithms, depending on the particular resources required to perform a job. For example, assuming a command that a relay be taken from a feeder and inserted into an available site on a circuit board, the operating system begins by sequentially searching through the "feeder" elements in order to locate a "relay" feeder. When an available feeder is located, it is marked as "allocated" to the present task. Thereafter, the operating system sequentially searches for a compound named "arm" looking for the first available "relay" arm. As an example of how an element would be chosen for the algorithm, assume a plurality of such arms are available, the operating system will compute the distance between each arm and the allocated feeder, the arm having the shorter distance to the feeder being chosen as the "allocated" arm. The process can further be optimized by selecting another available feeder and computing all of the distances to the available "relay" arms. Continuing in this matter, the operating system thus eventually locates the arm/feeder combination separated by the least distance, which resources are then allocated to the task.

In the above example, the automatic generation of a path also influences the final resource allocation since the operating system is also responsible for collision avoidance and umbilical cord de-tangling to be discussed in greater detail hereinbelow. In addition, in selecting the arm/feeder combination, the operating system must allocate a path between the selected arm and feeder (arranged in the tool changer of FIG. 1b, for example) which does not cause the arm to collide with another arm or which would cause two arms to entangle their umbilical cords. If no such path exists, the operating system can wait for a path to become available due to the movement of another arm to a non-colliding position. The operating system may also initiate selection of a different arm/feeder combination after failing to find an acceptable path after a predetermined time interval. It is only after the proper arm/feeder selection has been made that the resources are officially allocated to a path and are maintained allocated until being deallocated by the operating system or the user program.

Responsive to I/O commands, the operating system determines a specific signal path between the control cabinet I/O modules (such as electrical current, pneumatic pressure, on/off signal) and the target element for the I/O line (such as a heating or soldering element, screw driver or grippers which must be opened or closed). In addition, selected sensors are monitored, the precise ones to be monitored being determined by the operating system at run time after the robot and end effector selections have been made.

An example of the three aforementioned levels for each of the jobs, i.e. building towers and assembling boards are structured as follows:

EXAMPLE OF LEVELS OF OPERATING PROGRAM

Level 1: Work Requests

Two simultaneous work requests are made; one requests is to build 10 items called "towers" (which are defined in level 2), and the other request is to insert all circuit components in each board in a panel of boards.

At level 1 no resources are committed; the work requests are processed concurrently, independent of order.

```
DO
    FOR i=1 TO 10
        BUILD tower AT tower_site(i)
    NEXT i
END DO
```

Level 2: Jobs

At level 2, the individual jobs that comprise a work request are specified.

Execution proceeds according to which work requests were called for in Level 1.

The operating system allocates specific elements and compounds in Level 2. Motion paths remain undetermined.

```
BUILD tower Job:
    ALLOCATE arm := robot grasps ee grasps block
    ALLOCATE feeder := grasps block
            DO
                GETBLOCK blue
                PUTBLOCK blue
            END DO
            DO
                GETBLOCK white
                PUTBLOCK white
            END DO
            DO
                GETBLOCK red
                PUTBLOCK red
            END DO
ASSEMBLE board Job:
    ALLOCATE arm := robot grasps ee
    grasps component
    ALLOCATE feeder := grasps component
    DO ALL components
        GET component
        PUT component
    END DO
```

Level 3: Procedures

At Level 3, the steps to perform a job are specified in detail. The operating system chooses specific paths that ensure collision avoidance and cord de-tangling. Once a resource has been "allocated" a path, no other resource may intrude into that space until the space is deallocated by the operating system.

```
PROCEDURE GETBLOCK block:
        MOVE arm ABOVE feeder(block) .1 INCH
        MOVE arm TO feeder(block)
        GRASP block
        MOVE arm ABOVE feeder(block) .3 INCH
END PROCEDURE
PROCEDURE PUTBLOCK block:
        MOVE arm ABOVE block_sink_site .3 INCH
        MOVE arm TO block_sink_site
        IF insertion_sensor = FAILED then
        reject_block
        RELEASE block
        MOVE arm UP .1 INCH
END PROCEDURE
PROCEDURE GET component:
        MOVE arm ABOVE feeder(component) .050
        INCH
        MOVE arm TO feeder(component)
        GRASP component
        MOVE arm ABOVE feeder(block) .150 INCH
END PROCEDURE
PROCEDURE PUT component:
        MOVE arm ABOVE board[ ].site .150 INCH
        MOVE arm TO board[ ].site
        IF insertion_sensor = FAILED then
        reject_component
        RELEASE component
        MOVE arm UP .1 INCH
END PROCEDURE
```

The mechanical system of the present invention is designed in such a way as to enable the manipulators to be capable of moving substantially "around one another" allowing maximum accessibility of locations and elements (which elements include manipulators, end effectors or tools, parts feeders, parts and the product and product conveying devices). In addition, it is essential that all such elements in the system be as "interconnectable" with one another as is practical to allow the system elements to be mated to one another to optimize performance time and efficiency of use of the elements during each step of the manufacturing process.

As one example, by providing end effectors, parts feeders, parts and product which are all accessible by all robots, any one of several robots may be connectable with any one of several end effectors which in turn can lift, carry and release a variety of different parts derived from an array of different feeders in order to finally place the acquired part in a location which is part of the array in the product. Once a choice is made, a specific combination of elements chosen thereby are connected by the operating system to place a part on or in the product. All of these functions are accomplished in such a way that the robot elements do not collide with one another.

In situations where multiple manipulators share common resources and overlap each other's work space the standard link arm architectures which are conventional in the state of the art provide interferences which will inhibit the motions necessary to perform job tasks. In order to avoid such interference the present system utilizes a manipulator geometry which eliminates the need for a mechanical anchoring to a fixed base through linked extensions. The system geometry of the present invention is obtained through the use of electromagnetically propelled, two dimensional linear motors (see FIGS. 1 and 1b) which are typically powered through a flexible umbilical cord C representing the only physical anchor to the "world". Motion is achieved by advancing magnetic fields in the moving member (forcer) of the two dimensional linear motor, causing motion of the robot along a passive, stationary platen having a grid work of grooves in a ferromagnetic surface to facilitate accurate high-resolution stepping of the linear motors therealong. The linear motors preferably ride upon an air bearing created between the forcer and the platen to minimize frictional losses. One suitable linear motor which may be employed in the present invention is the dual-axis X-Y motor (model 7450) produced by Xynetics Products. The result is a small "footprint" device which can move freely in the plane of the platen and around other forcers. Since the umbilical cords are flexible, interferences do not in general inhibit the motion of forcers with respect to one another.

Additional mechanisms may be joined to the forcer to create additional degrees of freedom (for example, lift or movement in the "Z" direction and rotation ($\theta$) about a particular axis, which may or may not be the "Z" axis. For light assembly applications, a multiple axis manipulator is necessary to move parts and/or material from sources to sites. A minimum of four axes is typically required and the system may employ as many axes as are needed per manipulator, where applications so demand By using the aforementioned forcer/platen two dimensional linear motor design in combination with auxiliary Z-$\theta$ mechanisms the present invention provides a multi axis manipulator of small footprint which is capable of sharing the work space with other manipulators and which is not subject to the link interferences that pivotally linked robot arms experience when attempting to share a common work space.

Applicant's co-pending application Ser. No. 077,112 filed July 23, 1987 now U.S. Pat. No. 4,823,062, issued Apr. 18, 1989 describes such a forcer/platen arrangement which may be advantageously employed in the system of the present invention.

The manipulator (i.e. two dimensional linear motor) must also be capable of linking itself to system resources such as end effectors, feeders, parts and products. For example, a manipulator acquires an end effector which accesses a feeder and acquires a part which is mated to the product. All of these activities must occur without mechanical interferences. The mating of resources is mechanically enabled by creating connection options between the system elements. Common connection interfaces are created on the manipulators and end effectors to accomplish this objective. For example, note applicant's co-pending application Ser. No. 924,040 filed Oct. 28, 1986 now U.S. Pat. No. 4,67,595, issued Sept 19, 1989 which discloses one preferred arrangement of a "quick" disconnect device which allows the manipulator to quickly, easily and automatically attach itself (both mechanically and electrically) to an end effector and which may be disconnected therefrom with equal ease. The end effectors are utilized as connectors to their mating part feeders and parts and ultimately, the parts act as connectors to their respective mating products (such as "pins" in "holes")

The unique capability of automatic resource allocation i.e. the ability of choosing from among available resources, significantly reduces the programming responsibility of the user. In order to accomplish this, the user must provide sufficient information to the operating system during the TEACH process which phase is not completed until the operating system is informed about the spatial locations of all elements. During the TEACH phase, the geometry of the elements such as robots, feeders, grippers, I/O, parts, sites and the like are incorporated into the data base. In addition, the relevant properties of the elements are also introduced into the data base including the abilities of end effectors such as "grasping", "heating" and the like. The user also provides the possible compounds that may be assembled to perform a task such as, for example, robot 1, end effector 3, parts feeder 4, panel 1, board 2 and site 10 which are capable of performing a task such as, for example, delivering a part from feeder 4 to site 10 of board 2. In addition, the user teaches the operating system by providing data to the data base representative of the electrical, mechanical, logical, pneumatic and other possible connections necessary for performing other tasks.

Insertion sites are selected in a similar fashion whereby the operating system allocates an acceptable component-site-path using the same algorithms employed to assure collision avoidance and cord detangling when assembling a compound.

Allocations for determining which output line in the gripper to turn on are done simply by recalling the gripper which has been allocated and through the use of the "connector" tables created during the TEACH phase, the operating system readily traces the signal back to the control cabinet containing the I/O devices to determine which relay or other switching device is to be activated.

Figure 7:
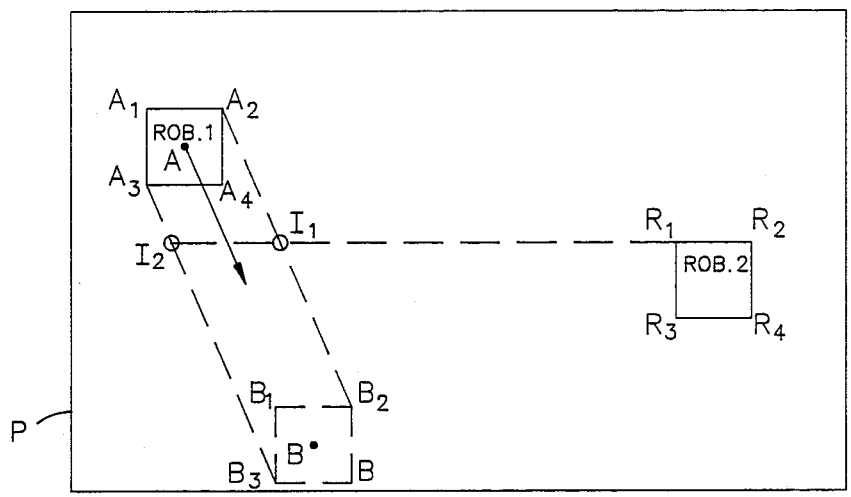
FIGS. 7 and 8 are plan views of a work area and showing robots to aid in an understanding of the collision prevention techniques of the present invention.
Figure 8:
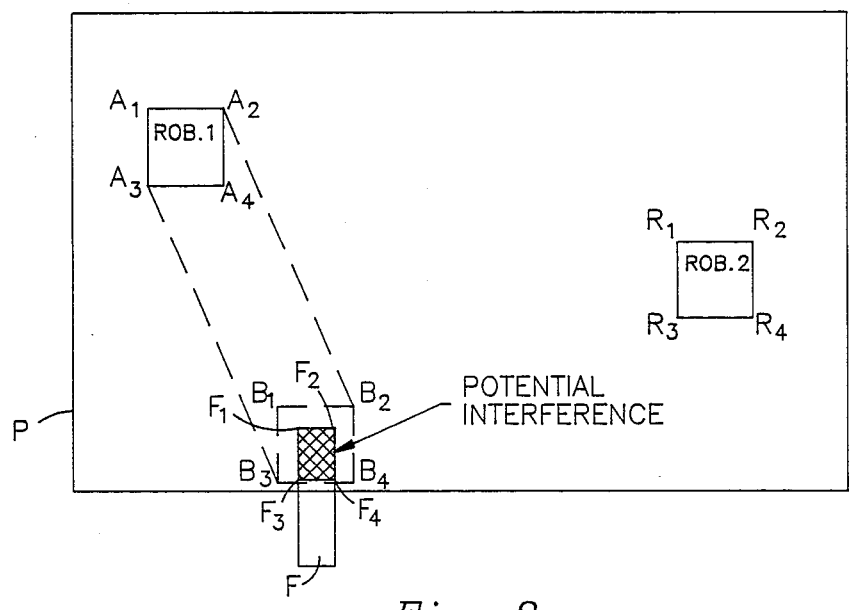

The collision avoidance algorithms are utilized to predict the possibility of collision between two arms and between a single arm and stationary objects such as parts feeder One technique for achieving the desired results is through utilizing cartesian geometry and the "small footprint" of the robot arms of the present invention The cartesian geometry, which can be understood from a consideration of FIGS. 7 and 8, provides that an arm can not reach outside of its small footprint to collide with anything The "small footprint" is achieved due to the fact that the moving part 20 (FIG. 1) of the arm rides on a platen P (FIG. 1a) and is attached only through a highly flexible umbilical cord C which carries electrical power, compressed air, etc. and is magnetically attracted to the platen surface No solid connection exists between the moving part of the robot and the "world frame". Thus only that part of the compound hanging down from the small moving robot can collide with anything, i.e. "the robot" and "end-effector" combination. Considering FIG. 7, for example, the cartesian coordinates for the path of robot R1 from position A to position B establish the area of movement of robot 1 and thus establish the region which robot 2 must be prevented from entering in order to avoid a collision.

FIG. 8 shows a slight modification of the arrangement shown in FIG. 7 wherein the cross-hatched region comprises the potential interference region in which the region defined by points B1 through B4 and the region defined by points F1 through F4 overlap. Thus, robot R1 may be prevented from experiencing the movement to location B due to the interference imposed by the feeder F, necessitating that robot 1 move over a path of reduced length in order to safely approach feeder F.

The present invention is significantly simplified as compared with conventional robot systems in which the problem is a volumetric, 3-D collision problem. In the present system, the volumetric overlap problem separates into an area overlap problem (2-D) plus a possible height overlap problem (1-D). In FIG. 7, which shows a projection of Robot 1 and Robot 2 on the platen surface, since the area defined by points A1, A3, B3, B4, B2, A2, A1 do not intersect with the area defined the points R1 through R4 of Robot 2, the arms will not collide in 3-D space as well and movement of Robot 1 from location A to location B is permissible. Overlapping areas are thus readily calculated by solving for the intersection of the lines that form the boundaries of the areas and determining if such intersections occur within the end points defined by swept areas. Considering FIG. 7 as an example, although the line passing through points R1, R2 intersects the swept area points I1 and I2, the line segment I1, I2 is entirely outside of the lines segment R1, R2. Thus, the top of the Robot 2 does not interfere with Robot 1 during its motion In a similar fashion, it can be seen that none of the remaining three sides of Robot 2 interfere with the area swept by Robot 1.

The algorithm does not differ even if Robot 2 is in motion, the only change being that the area swept by the motion of robot 2 is used in the area-interference calculations.

An extension of the algorithm is required in order to handle objects other than arms in the work station. Considering FIG. 8, although an area of overlap exists between Robot 1 and feeder F if in fact no overlap existed, robot 1 could not pick up a part. A robot can in fact be perched over feeder F and yet not create an interference problem. To assure that this is case, the algorithm examines the "z" coordinate of Robot 1 (i.e. the height) and compares it to the "z" coordinate which defines the top of feeder F. If the "z" of Robot 1 is above feeder F at the end of the motion, no collision is signaled even though the areas overlap in x-y space. To fine tune the algorithm, the height of the leading edge of Robot 1 can be calculated as it begins to pass over the feeder (i.e. point F1 in FIG. 8) to insure that Robot 1 will not nick the feeder F as it begins to pass over the feeder Using this approach, the general volumetric (3-D) interference problem is reduced to two much simpler problems namely an area interference (2-D) problem and a height interference (1-D) problem. The above approach to collision avoidance is "static" in that collisions are determined by looking at the entire area swept out during a proposed motion. However, this approach alone can cause a "deadlock" in the case, for example, where four robots arranged at the four corners of a square-shaped operating region desire to move clockwise into each others corner. The "static" algorithm will conclude that all motions cause the robots to collide and so will disallow all movement, even though simultaneous motion of all four robots will result in no collisions. The modifications of the algorithm that solves this problem is to permit the operating system to allow movement of a robot in the direction of desired motion but not all the way to the desired end point, for example, movement can be allowed for one or several robot footprint lengths along the desired path. After such partial movement the operating system then recalculates interferences. If there is a deadlock, the user is obliged to teach intermediate "safe" points for the arms to advance to in order to avoid all interferences.

Figure 9:
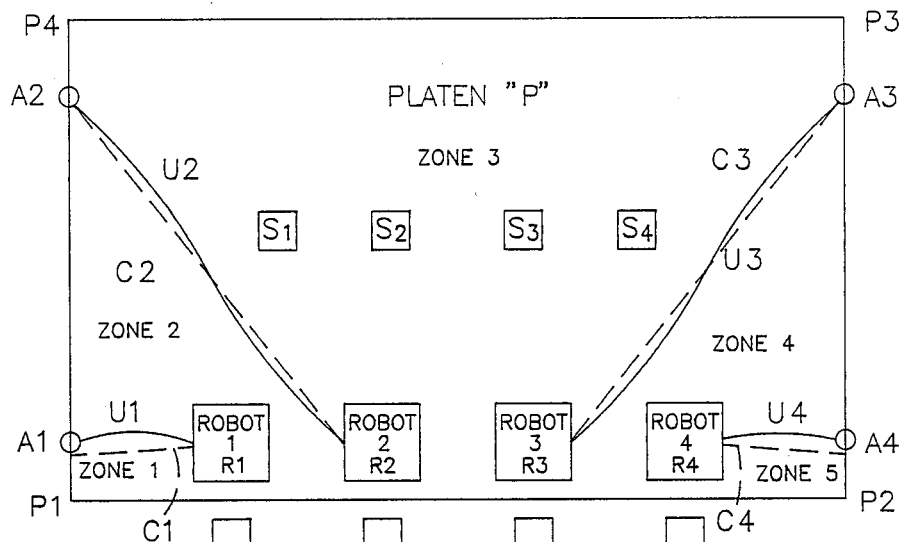
FIGS. 9 and 10 are plan views of a work area and showing robots to aid in an understanding of the cord detangling techniques of the present invention.

A technique for achieving cord de-tangling will now be described. FIG. 9 shows a work station comprised of four robots R1 through R4, feeders F1 through F4 and insertion sites S1 through S4. Initially, the robots are positioned adjacent to each of the four feeders, as shown. The data base during the teaching phase provides the operating system with the knowledge of the location of a point attachment of the umbilicals U1 through U4 of each of the arms to the "world frame" at A1 through A4. In addition, the operating system knows the center position of each robot "world space" as well as the location of the parameter of the platen P defined by corner points P1 through P4.

Utilizing the above data, the operating system constructs "zones" delineated by the platen perimeter, attachment points and robot centers. Robots R1 through R4 and their umbilicals serve to define zones Z1 through Z5, the border between adjacent zones being defined by a "mathematical" (imaginary) umbilical cord, said cords being shown as C1 through C4 in FIG. 9 and comprising a line from the robot point of attachment through the robot's center and terminating on the perimeter of platen P. With no cords intersecting, a zone is defined as the area under the "mathematical" cord and extending to the platen parameter or to the cord of another robot, whichever is the smaller area.

The cord de-tangling algorithm, in its simpliest phase, freely permits movement of any robot within the zones defined on either side of the "mathematical" umbilical cord. As an example, considering FIG. 9, robot R2 is permitted to move in zones Z2 and Z3.

Figure 10:
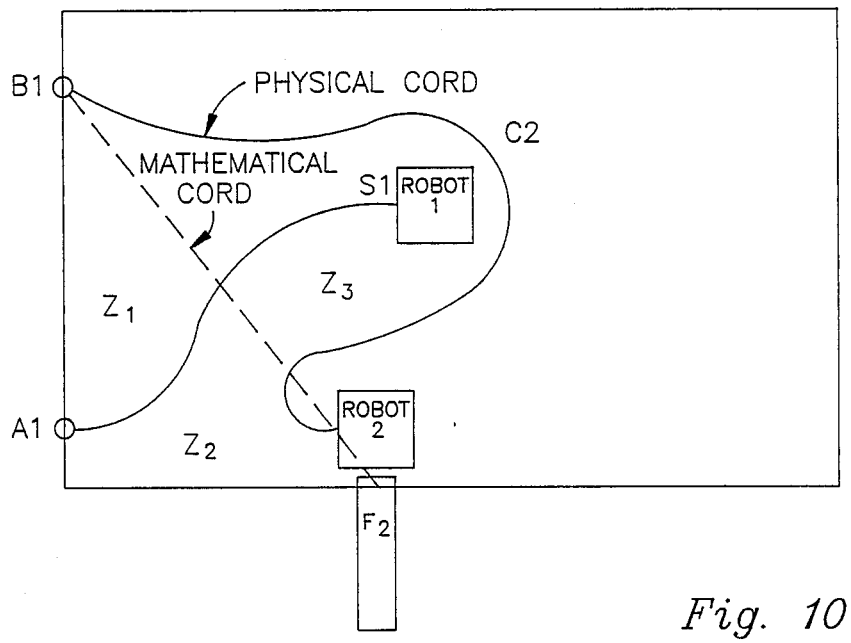

The umbilical cords are "flexible" or alternatively "loosely wound" upon a large take-up reel enabling a robot to "push" against the cord C of another robot without damage. This condition is shown in FIG. 10 wherein robot R1, in moving to site S1 in zone Z3, causes deflection of cord C2 of robot R2. In the example given, robot R1 has thus crossed into zone 3. The de-tangling algorithm allows this movement to be taken, but only once. Upon the next move, robot R1 is limited to movement back into either zone 1 or zone 2 thereby insuring de-tangling. Judicious selection of the work station lay-out, with respect to work sites, feeder locations, and points of attachment reduce the size of restricted zones to a minimum.

Debugging a multiple resource machine is complex, particularly when the resources are being automatically allocated. To aid in the debugging process, the operating system provides two debugging modes of runtime, operation: step and single cycle.

The user enters the debug mode by pressing a button on the control panel. In debug mode, a "window" on the display screen opens up for every work request that is issued. As jobs and tasks are invoked, sub-windows open up inside work request windows (i.e., the windows "nest"). Various screen formats are available to keep the number of windows that are simultaneously displayed within reason. Each window contains debugging information, such as the command that spawned the window, and the names of any resources that have been allocated in that window's level.

When in debug mode, the user may select SPECIFIC resources for debugging, bypassing the automatic resource allocation of the operating system. For example, the user may require that (specifically) Robot 1 move to a feeder because Robot 1 is suspected of a malfunction.

In debug mode, the user can execute a specific procedure or job, bypassing the three level structure of DNA. In this way, the program can be debugged in pieces, with the final program being built out of previously debugged smaller programs.

While in debug mode, the user may invoke the single step or single cycle debugging aids.

A single step is defined as any commitment to do a work request, job, or procedure command, or any allocation of resource by the operating system.

When the user hits a "single step" button, a given task (designated by the top level of nested windows) will execute one step, and then halt system execution. When the button is hit again, the next task will take a single step. Execution continues in a round-robin fashion, eventually returning to the first task in the chain. In this way, the user can watch each resource as it gets allocated, or monitor each motion or I/O operation as it happens.

An alternative single step mode is also available to the user. In this mode, each presently executing task takes one step, simultaneously with all the tasks. In this "system single step" mode, the user can watch for "system" errors that may not be evident from the single step action described previously.

A "cycle" is defined as the automatic execution of steps from the point when the system enters STOP mode, until a "CYCLE END" instruction in encountered. With this definition, we see that the length of a cycle and the number of cycles are completely user-determined: the program will have as many "cycles" as the user has inserted "CYCLE END" instructions.

When the user hits the "single cycle" button in the debug mode, one of the executing tasks will get out of STOP mode, and begin executing until a "CYCLE END" instruction is executed. It is the user's responsibility to judiciously insert cycle end commands where needed. When the button is hit again, the next task undergoes a cycle. This continues, in round-robin fashion, for all executing tasks. The action is analogous with the "single step" mode of operation.

Another mode of single cycle is available to the user, analogously defined to the alternative "single step"

mode. In this mode, each task executes a cycle concurrently with all tasks; the "system single cycle" is not over until ALL tasks complete their single cycle.

Figure 11:
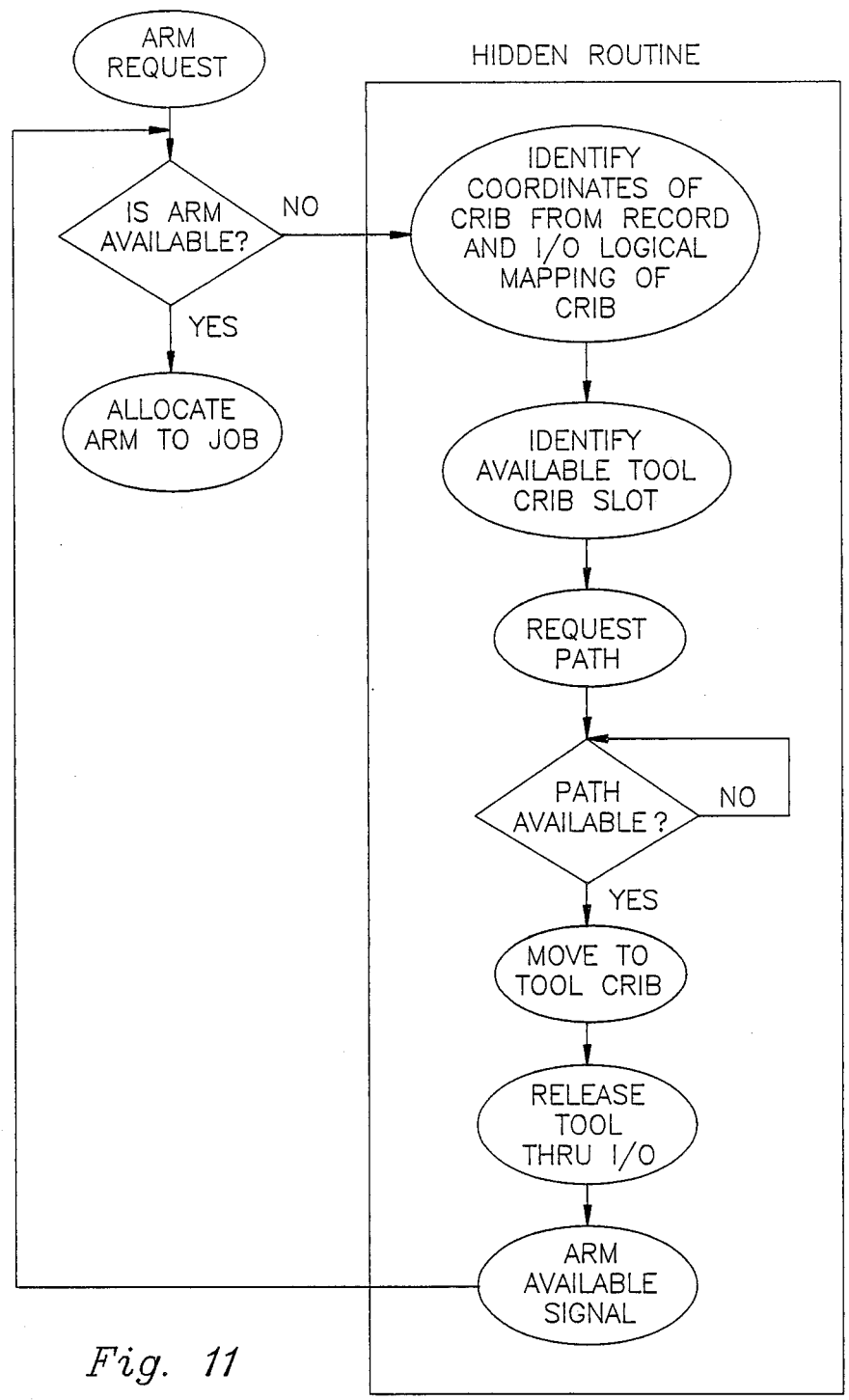
FIGS. 11, 12 and 15 are flow diagrams useful in explaining certain routines performed by the system of FIG. 1.
Figure 12:
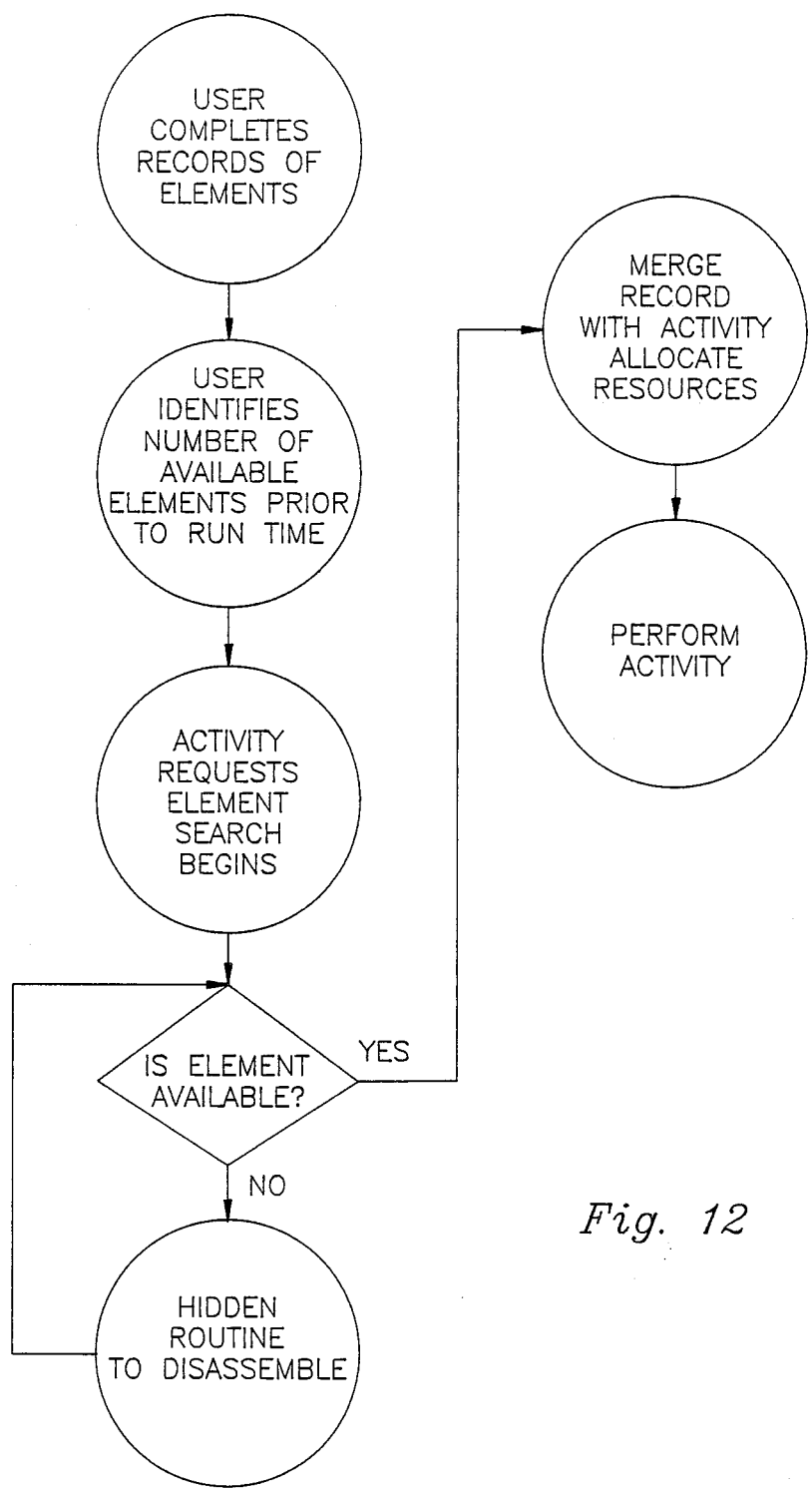
Figure 15:
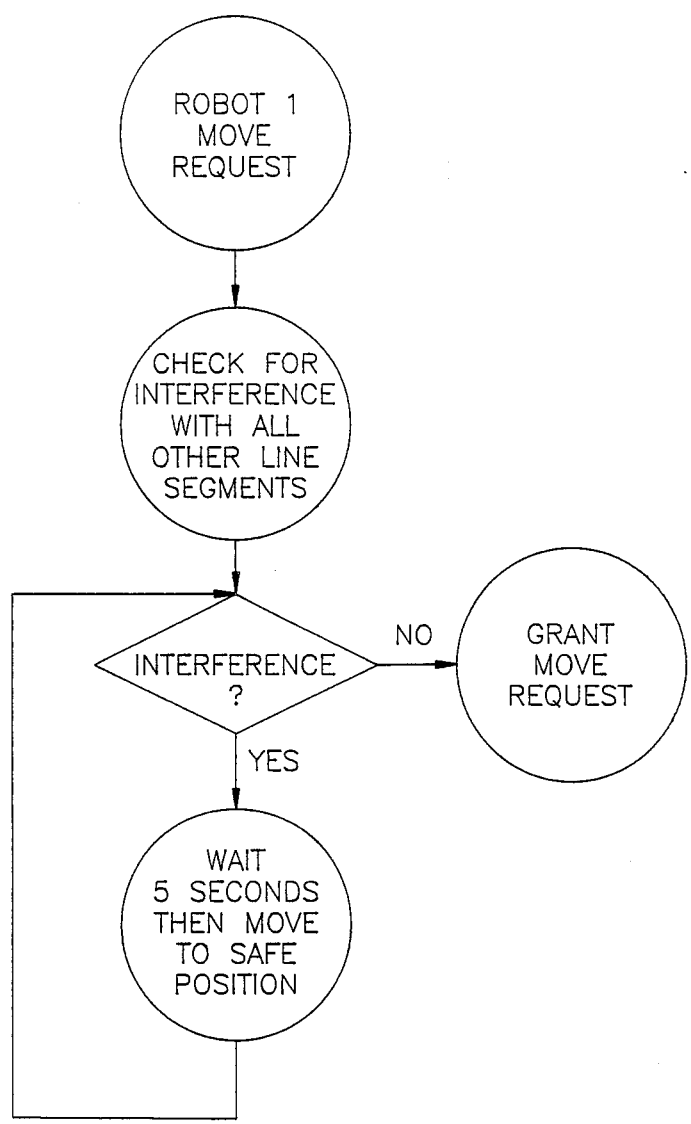

Examples of the programs employed in the system of the present invention will now be given in the form of flow diagrams as shown in FIGS. 11, 12 and 15.

During the teaching phase, the user, under control of the operating program, enters data in the following manner (under control of the operating system):

A menu driven technique is utilized to teach the system in order to create a descriptive record which is an organized data base. The created record contains the necessary information to enable the operating system to later execute logical and motion commands in order to automatically direct robots to build and disassemble compounds. In order to perform such operations, it is necessary that each system element be described in sufficient detail and in an organized data base. In this way, as hidden routines are executed, they draw on the data base for each element to identify relevant logical and spatial data. The data base approach employed in the system of the present invention is not unlike file merge data bases employed for a variety of business applications. Such data bases are used to merge record data with letters, lists, sales projections etc. For example, as each report is generated, the subject of the report is merged with data identifying the recipient of the report by title, name, address, department number, etc.

The present invention employs such data bases as follows:

During the teach phase, the user is asked, typically by menu driven displays, to describe each system element The element types supported by this system include:
 (1) robot arms
 (2) end effectors
 (3) tool cribs
 (4) part feeders
 (5) parts
 (6) assembly sites (in nested format)
 (7) other element types the user may create.

In teaching these elements, the system provides the user with a standard data base format with which to enter data. Data entry can be performed in several ways including:
 (1) keyboard
 (2) computer down load
 (3) record playback (for physical points)
 (4) sensors The types of data entry can include:
 (1) spatial points
 (2) physical data
 (3) logical data
 (4) other data as defined by the user.

As the user describes each element, the data base is filled according to a predetermined format. A brief description of how the data types, data entry techniques and elements link, will now be given:

Assuming that the user is now describing a new robot arm, the user, through keyboard entry, requests the teach mode and identifies "robot" as the element to be described when prompted by the teach menu (typically visual display). The operating system responds by displaying a screen with data requests (much like a blank form) which must be answered with one of the four (4) forms of data entry mentioned hereinabove. The completed data request will now be referred to as a record.

For a robot arm the record will include:
 (1) Arm serial number.
   (a) Keyboard response required.
 (2) Arm weight.
   (a) Keyboard response required.
 (3) Arm mechanical offsets.
   (a) User executes an automatic calibration routine for generating the offsets using sensor inputs. Offsets are automatically recorded in the record.
   (b) Calibration requires that the user moves the arm in close proximity to the "world" calibration site, using record/playback mode.
 (4) Physical limitations (e.g. Z-acceleration, Z-velocity, theta($\theta$) -acceleration, theta($\theta$)-velocity, axes resolution, Z and theta($\theta$), available force, available torque).
   (a) Keyboard response.
 (5) Tools the arm may access.
   (a) Keyboard response.
 (6) Logical links between the tool flange pneumatic/electric connections and system I/O relays.
   (a) Keyboard reponse.
 (7) Special features that the user may require.

Upon completion of the above sequence, the user will have entered logical data, spatial data and physical data and will have entered this data through keyboard entry, sensor base entry and record playback. The data base format stores data in an array which is accessible to the operating system and to the user. Symbolic names for the data in the record allows automatic data merges during program run-time. This arrangement can be seen to be similar to file merge programs used in business software, as was mentioned hereinabove.

In order for a user to teach positional data associated, for example, with a circuit board, the user creates a record for "assembly sites". This blank record will be called similarly to that for an arm and such a record will include:
 (1) Location (within the world) of the highest order frame in which replications of sites occur (for example, the panel in which the boards exist, and in which sites exist). This frame is given a symbolic name.
   (a) Sensor based entry is recommended, complemented with record/playback.
 (2) Location of the next order of frames in which sites occur (for example, the boards). These frames are given symbolic names.
   (a) Computer entry from a CAD (computer aided design) data base or keyboard entry are recommend.
 (3) Locations of sites within the higher order of frames.
   (a) Computer or keyboard entry are recommended.
 (4) The part type associated with each site.
   (a) Computer or keyboard entry are recommended.
 (5) Locations of any fiducial marks which are useful in conjunction with machine vision.
 (6) Special features the user may require.

Upon completion of this data entry sequence, the user will have created a data base record which fully describes the assembly sites both logically and spatially and will have entered this data using every form of available data entry including keyboard, CAD, sensors, and record/playback. Similar to the previous example, the symbolic names associated with all data allows future data mergers with the run-time program.

The operating system deals with replication and allocates elements in the following manner:

As was discussed hereinabove in the description of the teaching phase, the user must complete a data base on each accessible element. Upon system initialization, the user is queried as to the number of each element in the system. As a result, the data base is aware of all elements and their records.

Allocations of a resource are made when an activity requests an element. The request causes the operating system to search through its file of elements (records). When an available element is located, the operating system allocates it to the activity request. If no element is available, the request is queued until an element becomes available. During queue time, the operating system checks the availability of elements that may be assembled into usable compounds. If so, the hidden disassembled routines described hereinabove, create the requested element.

During run-time, as an operation progresses, the operating system has access to all elements that were approved by the user. Keeping in mind that the program that defines activities does not require a user definition of which element is to be used, the operating system selects a capable element from the available pool. Since there is no necessary relationship between activities and elements (except that an element must be competent for an activity) replication is accomplished by merging element records with any activity request. The flow chart of FIG. 12 shows the manner in which replication is performed.

Initially, and as was mentioned hereinabove, the user completes records of the elements and identifies the number of available elements prior to run-time. Upon the occurrence of an activity request, an element search begins. A test is made to determine the availablity thereof. In the event that no such element is available, the program branches to a hidden routine to perform a disassembly operation and the program returns to the element available test.

In the event that an element is available, the record for the element is merged with the activity and the resource is allocated to yield the appropriate compound. Thereafter, the activity requiring such a compound is performed.

The collision avoidance and cord de-tangling algorithms are performed during a part assembly operation in the following manner:

Arm-to-arm collision avoidances are performed through a mathematical algorithm which generates the virtual path of an arm. This virtual path consists of four or six lines which define the area in which the arm will travel during translation from point to point.

Before an arm moves, the operating system receives a move request which is generated at the procedure level of the operating system program. The operating system then generates the four-line move area (depending upon the angle of the path relative to the world, there may be as many as six lines). The operating system then checks for the presence of any line segment intersections that exist between the previously generated paths and the new path. Intersections imply a possible collision. A "move grant" is not generated until such time that intersections are eliminated. At the end of the physical move, the algorithm deletes the generated line segments associated with the path.

"Safe points" can be taught by the user in order to reduce the opportunity for system lock-up. Lock-up occurs if each arm is waiting for the other arm to move. By allowing the move for a fraction of the total path the lock-up problem is eliminated. An example of a "safe point" approach will be set forth hereinbelow.

Path lines are mathematically generated through a knowledge of the robot's projected area and tool center (this information is available from the arm's data base or record generated during the teach routine). The area is assumed to be a rectangular one unless specially modified by the user. Line segments are then created which connect each initial and final point of the corners of the rectangular area. Each line segment is mathematically defined in terms of the end points and slope. Other possible intersecting lines can thus be compared with this mathematical description to establish common spatial points. A graphical description is given below to clarify the algorithm.

Figure 13:
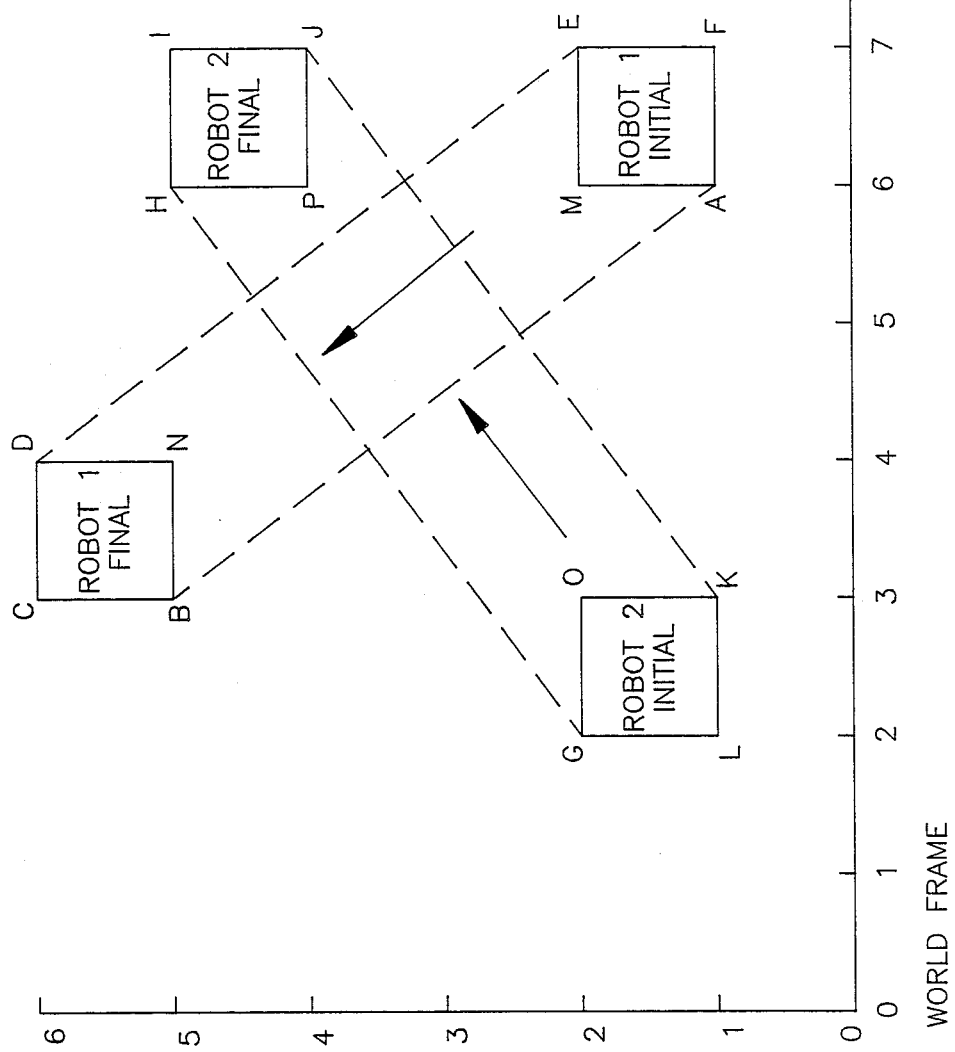
FIGS. 13, 16a and 16b are plan views of a work area and two robot "foot prints" useful in describing the cord detangling and collision avoidance techniques of the present invention.

FIG. 13 shows a top plan view of a world frame and two robots wherein Robot 1 is requested to move between an initial and a final position and wherein Robot 2 is similarly requested to move between its initial and final position. The table of FIG. 14 provides the line segment equation for each line segment as well as the XY line limit for each line segment equation. For example, the line segment A-B is given by the equation $Y = -4/3X + 9$ where X is equal to and less then 6 and is equal to or greater than 3 ($3 \leq X \leq 6$) and wherein Y is equal to or less than 5 and is equal to or greater than 1 ($3 \leq Y \leq 5$). The other equations and XY line limits are presented in similar fashion in FIG. 14.

Cord detangling is accomplished in a similar manner to collision avoidance. The points created by the umbilical cords' attachment to the frame, and the robot define a line segment. During the "move request" of an assembly process, an algorithm is called which, like collision avoidance, checks the intersection of the proposed path line segments with the cord's line segment. Due to the flexible nature of the cord however, the move requesting robot may intersect and cross the cord line by a fixed amount as determined experimentally according to the particular system application. At this point, the operating system stores the fact that, for example, line 1 has been crossed by Robot 2. Any subsequent moves must first insure that Robot 2 will not venture further cross line 1. As a practical matter, the operating system withdraws Robot 2 from the intersection of line 1 as soon as the required job is complete. FIG. 15 shows a simplified flow diagram of a collision avoidance algorithm. In the example given, Robot 1 has requested a path at which time no other path had been generated. The result of the request by Robot 1 was a comparison of the equations of Robot 1's proposed path line segments with any other line segments in the work space. The other line segments comprised the outline of Robot 2, or segments G-L, G-O, 0-K and L-K. These segments are compared with A-B, B-C, C-D, D-E, E-F and F-A. After it has been established that there are no intersections between robot 1's proposed segments and Robot 2's segments, a move grant is issued Immediately after Robot 1's move grant, Robot 2 requests a move which generates its associated proposed path line segment. These segments are then compared with the existing path segments of Robot 1. Since intersections are determined, the path grant for Robot 2 is not issued. Only after Robot 1 has completed its move and returned to its initial position will its associated path segments be reduced to B-N, N-D, D-C and C-B. At that time, the intersections will disappear, and Robot 2's move grant can be issued. Simple line segment equation comparison (setting two equations equal to one another) allows the mathematical determination of intersections.

Figure 16A:
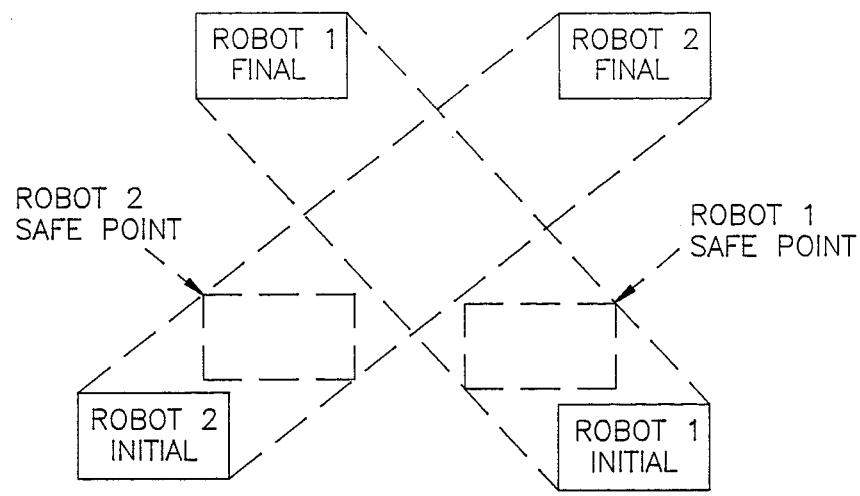
Figure 16B:
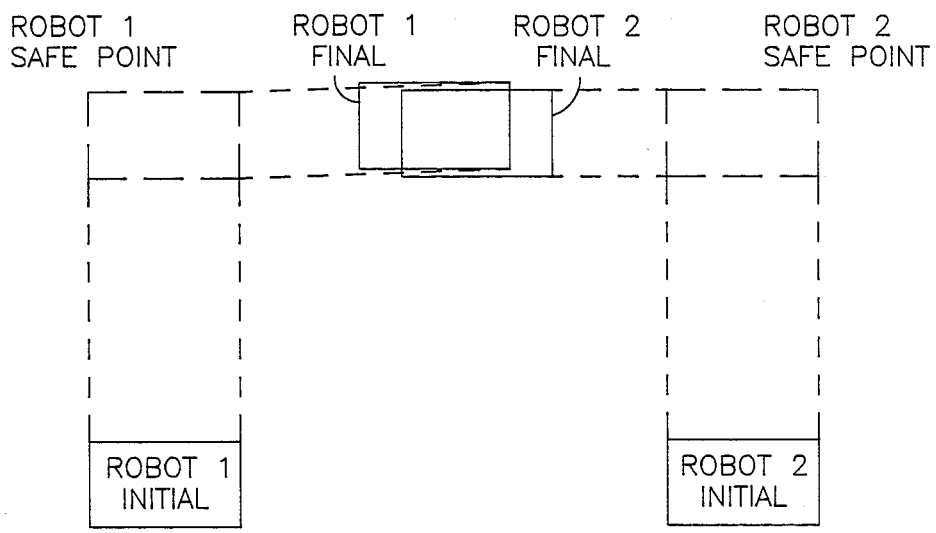

FIGS. 16a and 16b show a simplified view of a safe point arrangement which may be utilized to avoid lockup. FIG. 16a shows an arrangement in which the Robot 1 and/or 2 may be moved to the "safe point" locations, thus enabling simultaneous movement of both Robot 1 and Robot 2 wherein one of the two robots moves to its final destination while the other of the two robots is permitted to move toward its final position and is stopped at a "safe point", thus reducing the time required for the robot now located at its "safe point" to complete movement to its final position after the other robot has returned from its final position to its initial position.

FIG. 16b shows another possible "safe point" arrangement in which the robots are called upon to perform activities at final locations which overlap one another, i.e. which would indicate a collision . Assuming Robot 1 moves from its initial position to its final location, Robot 1 may traverse the L-shaped path shown in FIG. 16b. Robot 2, being the second of the two robots to request a path, moves from its initial position to a "safe point" simultaneously with the movement of Robot 1 from its initial position to its final position, thus being located at a position close to and yet sufficiently spaced from the final position of Robot 1 to avoid a collision. When Robot 1 reaches its safe point, Robot 2 may immediately initiate movement from its safe point to its final position. The arrangement of FIG. 16b shows another manner in which substantially simultaneous movement of the robots may be obtained and further in which the total operating time, i.e. run-time of the system is significantly reduced.

A latitude of modification, change and substitution is intended in the foregoing disclosure, and in some instances, some features of the invention will be employed without a corresponding use of other features. Accordingly, it is appropriate that the appended claims be construed broadly and in a manner consistent with the spirit and scope of the invention herein described.

What is claimed is:

1. A system for simultaneously performing a plurality of functions comprising:
   a work surface having a plurality of sites for supporting work pieces;
   a plurality of robots each being movable in mutually perpendicular directions along a common surface positioned adjacent to said work surface;
   a plurality of feeder stations for dispensing items at an outfeed location accessible to said robots;
   said robots including means for picking up an item from a feeder station and for releasing said item upon command; and
   means for controlling movement of said robots including means for selecting movement paths to avoid collisions between and among said robots.

2. The system of claim 1 wherein said controlling means for collision avoidance includes:
   means for mathematically generating a path of movement of a robot;
   means for storing data comprising mathematical representations of each object within the area of movement of said robots; and
   intersection determining means for determining if the perimeter portions of a path presently being generated intersects with any of the perimeter portions of any of the objects and for delaying movement of a robot whenever any of the perimeter portions of a path intersect with any of the perimeter portions of any of the objects.

3. The system of claim 2 wherein said path generating means comprises means for storing a request signal for the generation of a path and means for periodically energizing said path generating means to initiate a path generating operation until a non-colliding path is indicated.

4. The system of claim 3 further comprising means for concealing a request signal when a non-colliding path has been generated.

5. The system of claim 4 further comprising means for storing the mathematical representation of a path in said storing means responsive to determination of a non-colliding path by said intersection determining means.

6. The system of claim 2 further comprising means for preventing the storage of a generated path when the intersection determining indicates collision will occur between a path being generated and at least one of the stored paths.

7. The system of claim 1 wherein said controlling means further comprises:
   means for generating a movement request signal;
   means responsive to the request signal for generating a plurality of equations defining the perimeter of a region through which the robot is requested to move;
   means for comparing the generated equations with equations generated to represent the perimeters of regions in the work space previously allocated to other robots and to feeder stations to determine if the equations being compared intersect; and
   means for generating a moving signal for the robot when no intersections are present.

8. The system of claim 7 further including means to prevent generation of the moving signal responsive to the presence of an intersection of any of the compared equations.

9. The system of claim 7 further comprising means responsive to a moving signal for storing the equations of the robot for comparison with the equations representing regions to be occupied by another robot in the system.

10. A system for controlling a plurality of robots comprising:
    a work space;
    holder means arranged in close proximity to the work space for holding at least two elements, said elements including means for releasable coupling to a robot;
    means for storing data representing the work locations and the characteristics and location of said robots and said element; and
    selection means responsive to a job request for selecting from said data storing means the robot and an element to be releasably coupled thereto, said selection means including means for determining the distances between the robots and elements and means for selecting the robot and element to be coupled which will require the least travel time for moving the selected robot to the selected element and including means for controlling the selected robot and element to perform the requested job.

11. The system of claim 10 further comprising means for inserting data into said storing means to indicate those items which have been allocated to perform a jot to prevent consideration of the selected items for a requested job.

12. The system of claim 10 further comprising:
   each element having a coupling end and a manipulative end;
   job function performing devices provided at the manipulative end of each element;
   at least one power source for selectively powering the job function performing devices;
   a plurality of coupling lines in each of said robots for selectively coupling the power source to a variety of different elements;
   each element having a line for coupling to an associated line in a robot to which the element is coupled;
   each job function performing device being coupled to the line in its associated element;
   means for connecting the line in an element with one of said robot coupling lines when said element coupling end is coupled to the robot; and
   means for selectively coupling the power source to the line in said robot which is connected to the job function performing device through the line in said element.

13. A system of the type described in claim 10 wherein said storing means further includes stored data indicating the type of coupling for each element and the size of said elements and the type of coupling for each robot and the spatial location of each robot coupling;
   and means utilizing said stored information to determine the spatial location of a point on the element coupled to the robot.

14. A system of the type described in claim 10 having a plurality of work sites wherein said data storing means includes stored information relating to said work sites; means for selectively providing "convering" data for the stored information of selected ones of said work sites and means responsive to the stored information of work sites associated with covering data, and means responsive to said "covered" data for preventing selection of an element and a robot for performing an operation at predetermined "covered" work sites.

15. The system of claim 10 further comprising a plurality of work stations each having a plurality of interconnectable robots and elements associated with each work station;
   means for creating a record of the functions performed at each work station;
   means for generating a record request for each work station; and
   means at each work station for transferring the created record to the work stations requesting a record.

16. The system of claim 15 wherein said means for generating a record further includes means for indicating those activities capable of being performed but not completed at the work station generating the record.

17. The system of claim 15 wherein at least one of said work stations includes means responsive to said record for initially performing tasks not completed at the work station sending the record prior to the tasks normally performed at said receiving work station.

18. A method for operating a plurality of resources including robots selectively interconnectable with elements for respectively grasping and releasing items, and performing operations on items; feeders for feeding items; and including means for moving the robots over work stations; memory means for storing spatial information and characteristics of said robots, elements, feeders and items, said method including the steps of:
   examining the stored spatial information and characteristics for the resources to be interconnected responsive to a request indicating the type of job to be performed;
   creating perimeter portions of a path proposed for moving each robot to the elements and feeders;
   storing the path data of the proposed path in the memory means for each robot; and
   moving the robots along the associated stored paths.

19. The method of claim 18 further comprising the steps of comparing at least the perimeter portions of each path being determined with the perimeter portions representing objects and/or paths in the area of movement of said robots; and preventing a robot from moving along the path associated therewith when the last-mentioned path intersects with any previously stored path.

20. The method of claim 18 further comprising the steps of creating perimeter portions of an alternative proposed path when the previously proposed path intersects with previously stored data representing objects and paths.

21. A method for operating a plurality of resource including robots selectively interconnectable with elements for respectively grasping and releasing items for placement on a work surface including the sr of:
   generating a proposed path of movement for a robot which path comprises points identifying the perimeter of the area enclosed by said path;
   comparing perimeter portions of said proposed path with perimeter portions of other areas within the total area of movement of the robots which areas define the perimeters of objects and the perimeters of a path within which such objects are moved; and
   moving the robot along the proposed path in the event that none of the perimeter portions of the proposed path intersect with any of the perimeter portions of the occupied areas.

22. The method of claim 21 wherein the perimeter portions being compared comprise lines lying in a common plane which common plane corresponds to the work area over which the robots move.

23. The method of claim 21 further comparing data representing the position of an end of the robot closest to the work surface with data representing the height of the objects positioned within the area of movement of the robots to determine if a collision will occur and permitting movement of the robot along the proposed path in the event that the comparison indicates that no collision will occur.

24. The method of claim 23 further comprising the steps of comparing the position of the end of the robot closer to the work surface relative to the height of any objects located in the space within the area of movement of the robot at a point of intersection between the path perimeter portions of the proposed path with the perimeters of the areas occupied by said objects.

25. A method for performing operations at a work station by controlling two or more robots to perform said work substantially simultaneously wherein said work station is provided with a group of movable robots and a group of manipulators releasably attachable with said robots and arranged at predetermined locations accessible by said robots, said method comprising the steps of:

selecting one of the robots and one of the manipulators from the group of robots and the group of manipulators responsive to a work request whereby the robot and manipulator selected are separated by the shortest distance relative to the other available robots and manipulators;

creating a first proposed path of movement of the selected robot to the selected manipulator;

comparing the first proposed path with previously selected paths for moving other robots and with regions occupied by objects within the range of movement of said robots; and moving the selected robot to the selected manipulator in the event that no collisions are indicated as a result of the comparison step.

26. The method of claim 25 further comprising the step of coupling the selected robot to the selected manipulator;

generating a second proposed path for moving the selected robot now combined with the selected manipulator to initiate performance of a task;

comparing the second proposed path with previously developed paths and with areas occupied by objects; and moving the combined selected robot and manipulator along said second proposed path when no collisions are indicated.

27. A system for simultaneously performing a plurality of functions comprising:

a work surface having a plurality of sites for supporting work pieces;

a plurality of robots each being movable in mutually perpendicular directions along a common surface position adjacent to said work surface;

a plurality of tool cribs positioned adjacent said work surface, each crib including means for positioning and supporting a plurality of tools for performing a variety of different work activities;

storage means for storing data identifying all of the robots and tools including the characteristics and work capabilities of each;

means responsive to a work request for searching said storage means to locate robots and tools which are capable of being combined and which are further capable of performing the desired work activity; and means for allocating the selected components to prevent their subsequent selection upon the occurrence of a subsequent work request.

28. The system of claim 27 further comprising:

means for generating a first group of equations representing the perimeter of a region which the allocated robot must move to obtain the allocated tool;

said storage means including data corresponding to a second group of equations representing regions in the work surface occupied by elements;

means for determining if said first group of equations intersect with said second group of equations;

means for generating a moving signal in the absence of an intersection; and means for moving the robot to the location in the tool grip of the allocated tool responsive to said moving signal.

29. The system of claim 28 further comprising means for preventing movement of the robot to the allocated tool in the presence of any intersection of the compared equations.

30. The system of claim 28 further comprising:

means for queuing a work request in the absence of available elements for creating a compound capable of performing the activities of the queued work request a compound being comprised of a robot and tool connectable therewith; and means responsive to the presence of a queued work request for disassembling a previously allocated compound responsive to completion of a work request, said means including further means for identifying the characteristics and location at which the tool is returned in the tool crib to thereby be available for a subsequent compound which is suitable for performing the activities called for by the queued work request.

31. A system for simultaneously performing a plurality of functions comprising:

a work surface having a plurality of sites for supporting work pieces;

a plurality of robots each being movable in mutually perpendicular directions along the common surface position adjacent to said work surface;

a plurality of feeder stations for dispensing items at outfeed locations accessible to said robots;

said robots including means for picking up an item from a feeder station and for releasing said item upon demand;

means for controlling movement of said robots including means for selecting movement paths to avoid collisions between and among said robots;

said path moving and selection means including means for generating positions along said path which constitute safe points;

means responsive to a work request for generating equations representing a region through which a robot must move to perform a work function;

means for determining if said equations intersects with previously stored equations representing presently occupied regions within the work surface; and means responsive to the presence of an intersection to permit movement of the robot to said safe point.

32. A system of the claim 31 further comprising means responsive to the absence of any comparison means for enabling movement of said robot to a final destination.

33. The system of claim 32 further comprising means responsive to completion of a work activity for returning the robot to an initial starting point including means for removing the equations stored in the memory means representing the previously occupied region.

34. A method for producing robotic devices each comprised of a plurality of interconnectable elements which may be assembled by a microprocessor-based operating system including memory means, said method comprising the steps of:

(a) requesting the introduction of data associated with each of said elements including spatial data representing locations of connections and operating devices, physical data such as size, weight, operating speed and the like and logical data such as operating and control signals and the like;

(b) supplying the data requested in step (a);

(c) requesting the description of compounds which are composed of a plurality of interconnectable elements and the elements which may be used to create a compound when the data requested in step (a) has been supplied in step (b);

(d) supplying the data requested in step (c);

(e) requesting the description of the positional data identifying the locations of the product to be worked on by the compounds defined hereinabove when the data requested in step (c) has bee supplied in step (d);

(f) requesting data representing the jobs to be performed on the product when the data requested in step (e) has been supplied in step (f); and (g) employing the data supplied during steps (b), (d) and (f) to allocate elements to a compound and the N assembling the allocated elements upon receipt of a first job request.

35. The method of claim 34 wherein step (g) further comprises the step of operating the assembled compound to perform the requested job.

36. The method of claim 34 further comprising the step of storing data in said memory means for identifying the elements allocated for the compound responsive to the first job request; and preventing the selection of elements identified in said memory means is being allocated responsive to a subsequent job request.

37. The method of claim 36 further comprising the step of deallocating previously allocated elements for use in creating a new compound when there are insufficient unallocated elements available to create the compound necessary to perform the requested job.

38. The method of claim 26 wherein, in the event that a collision is indicated in the step of comparing the first proposed path, the step of moving the selected robot to the selected manipulator comprises repeating the selecting, creating, comparing, and moving steps for a robot and a manipulator other than those previously selected.

39. The system of claim 1 wherein said robots are each comprised of two-dimension linear motors each movable along a common planar surface positioned a spaced distance from said work surface.

40. The system of claim 39 wherein said common substantially planar surface is defined by a ferromagnetic member.

41. The system of claim 40 wherein said ferromagnetic member has a substantially planar surface provided with a grid-like pattern of grooves, forming a stator cooperating with said two-dimension linear motors.

* * * * *

UNITED STATES PATENT AND TRADEMARK OFFICE
CERTIFICATE OF CORRECTION

PATENT NO. : 4,890,241      Page 1 of 2

DATED : December 26, 1989

INVENTOR(S) : Hoffman et al.

It is certified that error appears in the above-identified patent and that said Letters Patent is hereby corrected as shown below:

```
Column 4, line 18, after "provide" insert --a--
Column 4, lines 47-48, "assembly" should be --assemble--
Column 4, line 62, after "floor" insert --space--
Column 4, line 64, "pheral" should be --peripheral--
Column 4, line 65, before "robots" insert --multiple--
Column 5, line 3, after "physical" insert --design--
Column 5, line 4, "em" should be --employing--
Column 5, line 5, "t" should be --the--
Column 5, line 5, after "a" insert --result--
Column 5, line 6, after "with" insert --each--
Column 5, line 7, after "to" insert --position--
Column 5, line 8, before "close" insert --in--
Column 5, line 11, "manipulate" should be --manipulator--
Column 5, line 14, "resouces" should be --resources--
Column 5, line 17, delete "to"
Column 5, line 17, "impratical" should be --impractical--
Column 5, line 63, "command" should be --commands--
```

UNITED STATES PATENT AND TRADEMARK OFFICE
CERTIFICATE OF CORRECTION

PATENT NO. : 4,890,241

DATED : December 26, 1989

INVENTOR(S) : Hoffman et al.

It is certified that error appears in the above-identified patent and that said Letters Patent is hereby corrected as shown below:

```
Column  7, line 68,     "FIG. lia"   should be  --FIG. la--
Column 24, line 53,     "in"         should be  --is--
Column 26, lines 49-50, "recommend"  should be  --recommended--
Column 28, line 44,     "cross"      should be  --across--
Column 31, line 36,     ""convering"" should be --"covering"--
Column 32, line 29,     "sr"         should be  --steps--
Column 33, line 62,     "grip"       should be  --crib--
```

Signed and Sealed this

Twenty-ninth Day of October, 1991

Attest:

HARRY F. MANBECK, JR.

*Attesting Officer*     *Commissioner of Patents and Trademarks*